US011006347B2

(12) United States Patent
Kadiri et al.

(10) Patent No.: US 11,006,347 B2
(45) Date of Patent: May 11, 2021

(54) PREVENTING USER EQUIPMENT THAT DOES NOT SUPPORT CELL-SPECIFIC REFERENCE SIGNAL (CRS) MUTING FROM CAMPING ON CRS MUTED CARRIERS

(71) Applicant: QUALCOMM Incorporated, San Diego, CA (US)

(72) Inventors: Prasad Kadiri, San Diego, CA (US); Alberto Rico Alvarino, San Diego, CA (US); Umesh Phuyal, San Diego, CA (US); Tae Min Kim, San Diego, CA (US); Mungal Singh Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/390,420

(22) Filed: Apr. 22, 2019

(65) Prior Publication Data

US 2019/0342819 A1   Nov. 7, 2019

Related U.S. Application Data

(60) Provisional application No. 62/668,100, filed on May 7, 2018.

(51) Int. Cl.
*H04W 48/02* (2009.01)
*H04W 48/16* (2009.01)
*H04W 84/04* (2009.01)

(52) U.S. Cl.
CPC ........... *H04W 48/02* (2013.01); *H04W 48/16* (2013.01); *H04W 84/045* (2013.01)

(58) Field of Classification Search
CPC ... H04W 48/02; H04W 48/16; H04W 84/045; H04L 5/0091; H04L 5/005
(Continued)

(56) References Cited

U.S. PATENT DOCUMENTS

2013/0188531 A1* 7/2013 Zhang ................... H04L 5/0007
370/280
2014/0177562 A1* 6/2014 Li .......................... H04L 5/0064
370/329
(Continued)

FOREIGN PATENT DOCUMENTS

WO    2008136574 A1    11/2008
WO    2014053597 A1     4/2014
(Continued)

OTHER PUBLICATIONS

Huawei et al., "On CRS Muting for BL UEs", 3GPP Draft; R2-1804840 On CRS Muting for BL UEs, 3rd Generation Partnership Project (3GPP), Mobile Competence Centre, 650, Route Des Lucioles; F-06921 Sophia-Antipolis Cedex, France, vol. RAN WG2, No. Sanya, China; Apr. 16, 2018-Apr. 20, 2018, Apr. 14, 2018 (Apr. 14, 2018), pp. 1-4, XP051428543, Retrieved from the Internet: http://www.3gpp.org/ftp/Meetings%5F3GPP%5FSYNC/RAN2/Docs/ [retrieved on Apr. 14, 2018], Sections 1, 2.1. 2.3.

(Continued)

*Primary Examiner* — Jutai Kao
*Assistant Examiner* — Syed M Bokhari
(74) *Attorney, Agent, or Firm* — QUALCOMM Incorporated

(57) ABSTRACT

Various aspects of the present disclosure generally relate to wireless communication. In some aspects, a user equipment (UE) may receive a first information element (IE) and a second IE, wherein the first IE indicates whether all UEs that do not support cell-specific reference signal (CRS) muting are barred from a carrier and the second IE indicates whether all UEs that support CRS muting are barred from the carrier; and selectively access the carrier based at least in part on at least one of the first IE or the second IE. In some aspects, a UE may determine whether the UE supports cell-specific reference signal (CRS) muting; and transmit, to a base (Continued)

station, a capability report that indicates whether the UE supports CRS muting. Numerous other aspects are provided.

37 Claims, 21 Drawing Sheets

(58) Field of Classification Search
USPC .................................... 370/328, 329, 280
See application file for complete search history.

(56) References Cited

U.S. PATENT DOCUMENTS

| | | | |
|---|---|---|---|
| 2015/0016339 A1 | 1/2015 | You et al. | |
| 2016/0112943 A1* | 4/2016 | Horn | H04W 48/18 370/329 |
| 2016/0315740 A1* | 10/2016 | Yi | H04L 5/005 |
| 2018/0220303 A1* | 8/2018 | Futaki | H04W 72/02 |
| 2018/0220344 A1* | 8/2018 | Shaheen | H04W 4/60 |
| 2018/0284149 A1* | 10/2018 | Kommi | G01S 19/49 |
| 2018/0288683 A1* | 10/2018 | Bendlin | H04W 48/10 |
| 2018/0302834 A1* | 10/2018 | Zhang | H04W 36/08 |
| 2019/0342820 A1* | 11/2019 | Chen | H04W 48/02 |

FOREIGN PATENT DOCUMENTS

| | | |
|---|---|---|
| WO | 2017051942 A1 | 3/2017 |
| WO | 2017079539 A1 | 5/2017 |

OTHER PUBLICATIONS

International Search Report and Written Opinion—PCT/US2019/028685—ISA/EPO—dated Sep. 27, 2019.
Partial International Search Report—PCT/US2019/028685—ISA/EPO—dated Jul. 15, 2019.

* cited by examiner

US 11,006,347 B2

PREVENTING USER EQUIPMENT THAT DOES NOT SUPPORT CELL-SPECIFIC REFERENCE SIGNAL (CRS) MUTING FROM CAMPING ON CRS MUTED CARRIERS

CROSS-REFERENCE TO RELATED APPLICATIONS UNDER 35 U.S.C. § 119

This application claims priority to U.S. Provisional Patent Application No. 62/668,100, filed on May 7, 2018, entitled "TECHNIQUES AND APPARATUSES FOR PREVENTING USER EQUIPMENT THAT DOES NOT SUPPORT CELL-SPECIFIC REFERENCE SIGNAL (CRS) MUTING FROM CAMPING ON CRS MUTED CARRIERS," which is hereby expressly incorporated by reference herein.

FIELD OF THE DISCLOSURE

Aspects of the present disclosure generally relate to wireless communication and to techniques and apparatuses for preventing user equipment that does not support cell-specific reference signal (CRS) muting from camping on CRS muted carriers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station, may include determining whether a carrier, associated with the base station, uses cell-specific reference signal (CRS) muting; determining a master information block (MIB) scrambling sequence or a physical broadcast channel (PBCH) scrambling sequence to be used to scramble a MIB or a PBCH of the carrier based at least in part on whether the carrier uses CRS muting; and transmitting the MIB or the PBCH, wherein the MIB or the PBCH is scrambled using the determined MIB scrambling sequence or the determined PBCH scrambling sequence.

In some aspects, a base station for wireless communication may include memory and one or more processors configured to determine whether a carrier, associated with the base station, uses cell-specific reference signal (CRS) muting; determine a master information block (MIB) scrambling sequence or a physical broadcast channel (PBCH) scrambling sequence to be used to scramble a MIB or a PBCH of the carrier based at least in part on whether the carrier uses CRS muting; and transmit the MIB or the PBCH, wherein the MIB or the PBCH is scrambled using the determined MIB scrambling sequence or the determined PBCH scrambling sequence.

In some aspects, a non-transitory computer-readable medium may store one or more instructions for wireless communication. The one or more instructions, when executed by one or more processors of a base station, may cause the one or more processors to determine whether a carrier, associated with the base station, uses cell-specific reference signal (CRS) muting; determine a master information block (MIB) scrambling sequence or a physical broadcast channel (PBCH) scrambling sequence to be used to scramble a MIB or a PBCH of the carrier based at least in part on whether the carrier uses CRS muting; and transmit the MIB or the PBCH, wherein the MIB or the PBCH is scrambled using the determined MIB scrambling sequence or the determined PBCH scrambling sequence.

In some aspects, an apparatus for wireless communication may include means for determining whether a carrier, associated with the apparatus, uses cell-specific reference signal (CRS) muting; means for determining a master information block (MIB) scrambling sequence or a physical broadcast channel (PBCH) scrambling sequence to be used to scramble a MIB or a PBCH of the carrier based at least in part on whether the carrier uses CRS muting; and means for transmitting the MIB or the PBCH, wherein the MIB or the PBCH is scrambled using the determined MIB scrambling sequence or the determined PBCH scrambling sequence.

In some aspects, a method of wireless communication, performed by a UE, may include receiving a master information block (MIB) or a physical broadcast channel (PBCH); determining that descrambling the MIB or the PBCH based at least in part on a first scrambling sequence results in an error; and descrambling the MIB or the PBCH based at least in part on a second scrambling sequence based at least in part on determining that descrambling the MIB or the PBCH based at least in part on the first scrambling sequence results in the error.

In some aspects, a UE for wireless communication may include memory and one or more processors configured to receive a master information block (MIB) or a physical broadcast channel (PBCH); determine that descrambling the MIB or the PBCH based at least in part on a first scrambling sequence results in an error; and descramble the MIB or the PBCH based at least in part on a second scrambling sequence based at least in part on determining that descrambling the MIB or the PBCH based at least in part on the first scrambling sequence results in the error.

In some aspects, a non-transitory computer-readable medium may store one or more instructions for wireless communication. The one or more instructions, when executed by one or more processors of a UE, may cause the one or more processors to receive a master information block (MIB) or a physical broadcast channel (PBCH); determine that descrambling the MIB or the PBCH based at least in part on a first scrambling sequence results in an error; and descramble the MIB or the PBCH based at least in part on a second scrambling sequence based at least in part on determining that descrambling the MIB or the PBCH based at least in part on the first scrambling sequence results in the error.

In some aspects, an apparatus for wireless communication may include means for receiving a master information block (MIB) or a physical broadcast channel (PBCH); means for determining that descrambling the MIB or the PBCH based at least in part on a first scrambling sequence results in an error; and means for descrambling the MIB or the PBCH based at least in part on a second scrambling sequence based at least in part on determining that descrambling the MIB or the PBCH based at least in part on the first scrambling sequence results in the error.

In some aspects, a method of wireless communication, performed by a base station, may include determining whether a carrier, associated with the base station, uses cell-specific reference signal (CRS) muting; determining a first symbol to be used to transmit a primary synchronization signal (PSS) and a second symbol to be used to transmit a secondary synchronization signal (SSS) based at least in part on whether the carrier uses CRS muting; and transmitting the PSS in the first symbol and the SSS in the second symbol.

In some aspects, a base station for wireless communication may include memory and one or more processors configured to determine whether a carrier, associated with the base station, uses cell-specific reference signal (CRS) muting; determine a first symbol to be used to transmit a primary synchronization signal (PSS) and a second symbol to be used to transmit a secondary synchronization signal (SSS) based at least in part on whether the carrier uses CRS muting; and transmit the PSS in the first symbol and the SSS in the second symbol.

In some aspects, a non-transitory computer-readable medium may store one or more instructions for wireless communication. The one or more instructions, when executed by one or more processors of a base station, may cause the one or more processors to determine whether a carrier, associated with the base station, uses cell-specific reference signal (CRS) muting; determine a first symbol to be used to transmit a primary synchronization signal (PSS) and a second symbol to be used to transmit a secondary synchronization signal (SSS) based at least in part on whether the carrier uses CRS muting; and transmit the PSS in the first symbol and the SSS in the second symbol.

In some aspects, an apparatus for wireless communication may include means for determining whether a carrier, associated with the apparatus, uses cell-specific reference signal (CRS) muting; means for determining a first symbol to be used to transmit a primary synchronization signal (PSS) and a second symbol to be used to transmit a secondary synchronization signal (SSS) based at least in part on whether the carrier uses CRS muting; and means for transmitting the PSS in the first symbol and the SSS in the second symbol.

In some aspects, a method of wireless communication, performed by a UE, may include determining that a primary synchronization signal (PSS) or a secondary synchronization signal (SSS) is not present in a corresponding first symbol or second symbol; and monitoring a third symbol for the PSS and a fourth symbol for the SSS based at least in part on determining that the PSS or the SSS is not present in the corresponding first symbol or second symbol, wherein the third symbol has a different symbol position than the first symbol within a resource block, and wherein the fourth symbol has a different symbol position than the second symbol within the resource block.

In some aspects, a UE for wireless communication may include memory and one or more processors configured to determine that a primary synchronization signal (PSS) or a secondary synchronization signal (SSS) is not present in a corresponding first symbol or second symbol; and monitor a third symbol for the PSS and a fourth symbol for the SSS based at least in part on determining that the PSS or the SSS is not present in the corresponding first symbol or second symbol, wherein the third symbol has a different symbol position than the first symbol within a resource block, and wherein the fourth symbol has a different symbol position than the second symbol within the resource block.

In some aspects, a non-transitory computer-readable medium may store one or more instructions for wireless communication. The one or more instructions, when executed by one or more processors of a UE, may cause the one or more processors to determine that a primary synchronization signal (PSS) or a secondary synchronization signal (SSS) is not present in a corresponding first symbol or second symbol; and monitor a third symbol for the PSS and a fourth symbol for the SSS based at least in part on determining that the PSS or the SSS is not present in the corresponding first symbol or second symbol, wherein the third symbol has a different symbol position than the first symbol within a resource block, and wherein the fourth symbol has a different symbol position than the second symbol within the resource block.

In some aspects, an apparatus for wireless communication may include means for determining that a primary synchronization signal (PSS) or a secondary synchronization signal (SSS) is not present in a corresponding first symbol or second symbol; and means for monitoring a third symbol for the PSS and a fourth symbol for the SSS based at least in part on determining that the PSS or the SSS is not present in the corresponding first symbol or second symbol, wherein the third symbol has a different symbol position than the first symbol within a resource block, and wherein the fourth symbol has a different symbol position than the second symbol within the resource block.

In some aspects, a method of wireless communication, performed by a base station, may include determining whether a carrier, associated with the base station, uses cell-specific reference signal (CRS) muting; configuring a first information element (IE) and a second IE based at least in part on determining whether the carrier uses CRS muting, wherein the first IE indicates whether all user equipment (UEs) that do not support CRS muting are barred from the carrier and the second IE indicates whether all UEs that support CRS muting are barred from the carrier; and transmitting the first IE and the second IE to a UE.

In some aspects, a base station for wireless communication may include memory and one or more processors configured to determine whether a carrier, associated with the base station, uses cell-specific reference signal (CRS) muting; configure a first information element (IE) and a second IE based at least in part on determining whether the carrier uses CRS muting, wherein the first IE indicates whether all user equipment (UEs) that do not support CRS muting are barred from the carrier and the second IE indicates whether all UEs that support CRS muting are barred from the carrier; and transmit the first IE and the second IE to a UE.

In some aspects, a non-transitory computer-readable medium may store one or more instructions for wireless communication. The one or more instructions, when executed by one or more processors of a base station, may cause the one or more processors to determine whether a carrier, associated with the base station, uses cell-specific reference signal (CRS) muting; configure a first information element (IE) and a second IE based at least in part on determining whether the carrier uses CRS muting, wherein the first IE indicates whether all user equipment (UEs) that do not support CRS muting are barred from the carrier and the second IE indicates whether all UEs that support CRS muting are barred from the carrier; and transmit the first IE and the second IE to a UE.

In some aspects, an apparatus for wireless communication may include means for determining whether a carrier, associated with the apparatus, uses cell-specific reference signal (CRS) muting; means for configuring a first information element (IE) and a second IE based at least in part on determining whether the carrier uses CRS muting, wherein the first IE indicates whether all user equipment (UEs) that do not support CRS muting are barred from the carrier and the second IE indicates whether all UEs that support CRS muting are barred from the carrier; and means for transmitting the first IE and the second IE to a UE.

In some aspects, a method of wireless communication, performed by a UE, may include receiving a first information element (IE) and a second IE, wherein the first IE indicates whether all UEs that do not support cell-specific reference signal (CRS) muting are barred from a carrier and the second IE indicates whether all UEs that support CRS muting are barred from the carrier; and selectively accessing the carrier based at least in part on at least one of the first IE or the second IE.

In some aspects, a UE for wireless communication may include memory and one or more processors configured to receive a first information element (IE) and a second IE, wherein the first IE indicates whether all UEs that do not support cell-specific reference signal (CRS) muting are barred from a carrier and the second IE indicates whether all UEs that support CRS muting are barred from the carrier; and selectively access the carrier based at least in part on at least one of the first IE or the second IE.

In some aspects, a non-transitory computer-readable medium may store one or more instructions for wireless communication. The one or more instructions, when executed by one or more processors of a UE, may cause the one or more processors to receive a first information element (IE) and a second IE, wherein the first IE indicates whether all UEs that do not support cell-specific reference signal (CRS) muting are barred from a carrier and the second IE indicates whether all UEs that support CRS muting are barred from the carrier; and selectively access the carrier based at least in part on at least one of the first IE or the second IE.

In some aspects, an apparatus for wireless communication may include means for receiving a first information element (IE) and a second IE, wherein the first IE indicates whether all UEs that do not support cell-specific reference signal (CRS) muting are barred from a carrier and the second IE indicates whether all UEs that support CRS muting are barred from the carrier; and means for selectively accessing the carrier based at least in part on at least one of the first IE or the second IE.

In some aspects, a method of wireless communication, performed by a base station, may include receiving, from a neighbor base station, an indication of one or more carriers of the neighbor base station that use cell-specific reference signal (CRS) muting; and transmitting, to a user equipment (UE), information that identifies the one or more carriers of the neighbor base station that use CRS muting.

In some aspects, a base station for wireless communication may include memory and one or more processors configured to receive, from a neighbor base station, an indication of one or more carriers of the neighbor base station that use cell-specific reference signal (CRS) muting; and transmit, to a user equipment (UE), information that identifies the one or more carriers of the neighbor base station that use CRS muting.

In some aspects, a non-transitory computer-readable medium may store one or more instructions for wireless communication. The one or more instructions, when executed by one or more processors of a base station, may cause the one or more processors to receive, from a neighbor base station, an indication of one or more carriers of the neighbor base station that use cell-specific reference signal (CRS) muting; and transmit, to a user equipment (UE), information that identifies the one or more carriers of the neighbor base station that use CRS muting.

In some aspects, an apparatus for wireless communication may include means for receiving, from a neighbor base station, an indication of one or more carriers of the neighbor base station that use cell-specific reference signal (CRS) muting; and means for transmitting, to a user equipment (UE), information that identifies the one or more carriers of the neighbor base station that use CRS muting.

In some aspects, a method of wireless communication, performed by a UE, may include receiving, from a serving base station, an indication of one or more carriers of a neighbor base station that use cell-specific reference signal (CRS) muting; and selectively accessing at least one of the one or more carriers based at least in part on whether the UE supports CRS muting.

In some aspects, a UE for wireless communication may include one or more processors configured to receive, from a serving base station, an indication of one or more carriers of a neighbor base station that use cell-specific reference signal (CRS) muting; and selectively access at least one of the one or more carriers based at least in part on whether the UE supports CRS muting.

In some aspects, a non-transitory computer-readable medium may store one or more instructions for wireless communication. The one or more instructions, when executed by one or more processors of a UE, may cause the one or more processors to receive, from a serving base station, an indication of one or more carriers of a neighbor base station that use cell-specific reference signal (CRS) muting; and selectively access at least one of the one or more carriers based at least in part on whether the UE supports CRS muting.

In some aspects, an apparatus for wireless communication may include means for receiving, from a serving base station, an indication of one or more carriers of a neighbor base station that use cell-specific reference signal (CRS) muting; and means for selectively accessing at least one of the one or more carriers based at least in part on whether the apparatus supports CRS muting.

In some aspects, a method of wireless communication, performed by a base station, may include receiving, from a user equipment (UE), a capability report that indicates whether the UE supports cell-specific reference signal (CRS) muting; determining whether the base station supports CRS muting; and selectively paging the UE on a carrier based at least in part on whether the UE supports CRS muting and whether the base station supports CRS muting for the carrier.

In some aspects, a base station for wireless communication may include memory and one or more processors configured to receive, from a user equipment (UE), a capability report that indicates whether the UE supports cell-specific reference signal (CRS) muting; determine whether the base station supports CRS muting; and selectively page the UE on a carrier based at least in part on whether the UE supports CRS muting and whether the base station supports CRS muting for the carrier.

In some aspects, a non-transitory computer-readable medium may store one or more instructions for wireless communication. The one or more instructions, when executed by one or more processors of a base station, may cause the one or more processors to receive, from a user equipment (UE), a capability report that indicates whether the UE supports cell-specific reference signal (CRS) muting; determine whether the base station supports CRS muting; and selectively page the UE on a carrier based at least in part on whether the UE supports CRS muting and whether the base station supports CRS muting for the carrier.

In some aspects, an apparatus for wireless communication may include means for receiving, from a user equipment (UE), a capability report that indicates whether the UE supports cell-specific reference signal (CRS) muting; means for determining whether the apparatus supports CRS muting; and means for selectively paging the UE on a carrier based at least in part on whether the UE supports CRS muting and whether the apparatus supports CRS muting for the carrier.

In some aspects, a method of wireless communication, performed by a UE, may include determining whether the UE supports cell-specific reference signal (CRS) muting; and transmitting, to a base station, a capability report that indicates whether the UE supports CRS muting.

In some aspects, a UE for wireless communication may include memory and one or more processors configured to determine whether the UE supports cell-specific reference signal (CRS) muting; and transmit, to a base station, a capability report that indicates whether the UE supports CRS muting.

In some aspects, a non-transitory computer-readable medium may store one or more instructions for wireless communication. The one or more instructions, when executed by one or more processors of a UE, may cause the one or more processors to determine whether the UE supports cell-specific reference signal (CRS) muting; and transmit, to a base station, a capability report that indicates whether the UE supports CRS muting.

In some aspects, an apparatus for wireless communication may include means for determining whether the apparatus supports cell-specific reference signal (CRS) muting; and means for transmitting, to a base station, a capability report that indicates whether the UE supports CRS muting.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
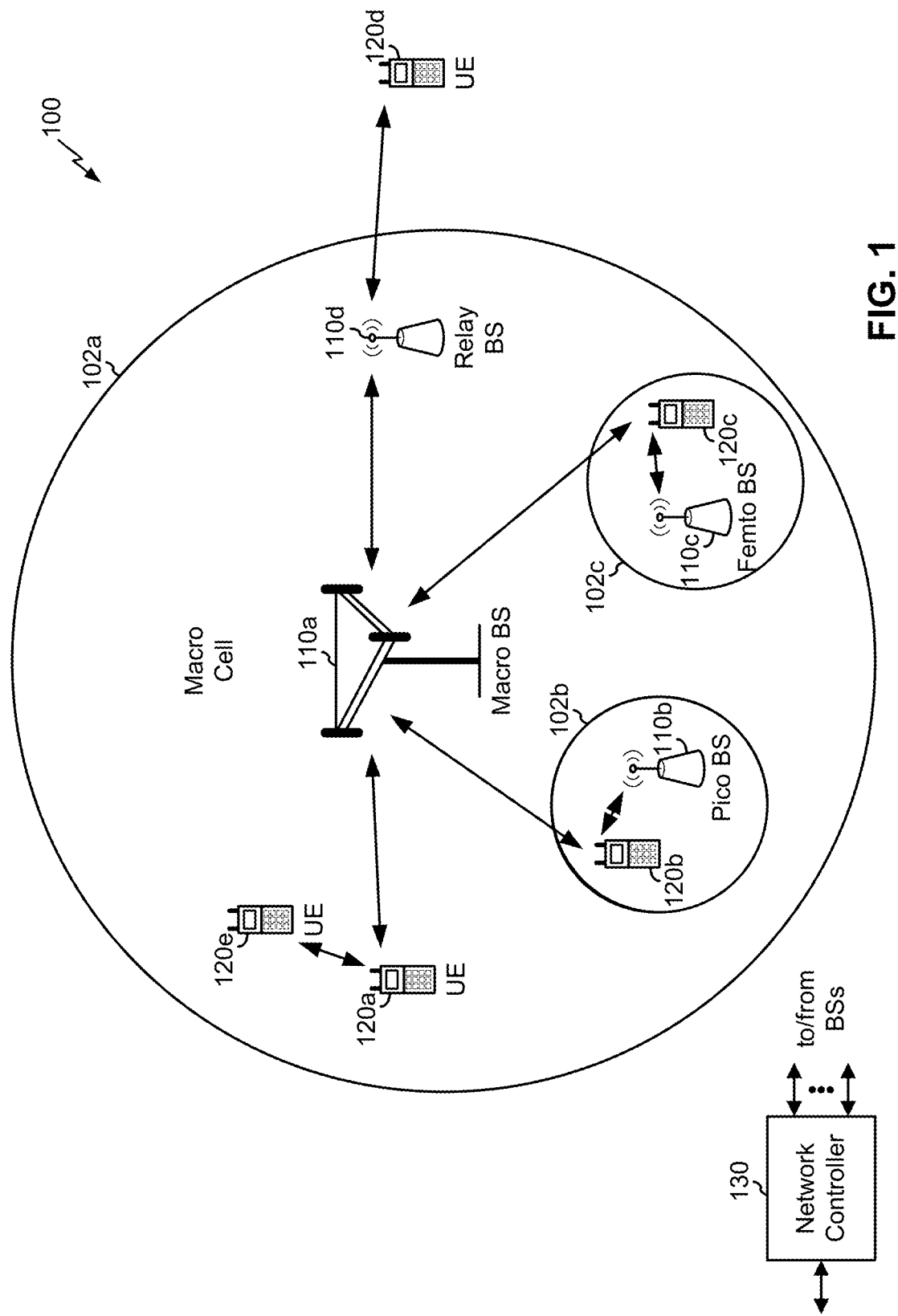
FIG. 1 is a block diagram conceptually illustrating an example of a wireless communication network, in accordance with various aspects of the present disclosure.

In some radio access technologies, such as LTE, a cell-specific reference signal (CRS) may be periodically broadcast by a base station, such as in every subframe (e.g., every 1 ms). For example, the CRS may be a pilot signal inserted into a downlink signal. The CRS may be broadcast across all resource blocks (RBs) in every carrier frequency, and may be used by a UE for timing and frequency synchronization, for radio resource management (RRM) measurements (e.g., RSRP measurements, RSRQ measurements, SINR measurements, and/or the like), for time domain and frequency domain channel estimation, for coherent demodulation, for channel state information (CSI) measurements (e.g., a channel quality indicator (CQI) measurement, a precoding matrix indicator (PMI) measurement, a rank indicator (RI) measurement, and/or the like), and/or the like.

This periodic broadcasting of CRS across all RBs by a base station may cause interference to neighbor base stations, and may negatively impact demodulation performance of neighbor cell UEs, neighbor cell capacity, RRM measurements in neighbor cells, CSI measurements in neighbor cells, and/or the like. Furthermore, broadcasting CRS across all RBs may consume significant network resource overhead. To mitigate these issues, CRS muting may be used. In CRS muting, CRS may be broadcast in only the central 6 physical resource blocks (PRBs) of carrier bandwidth, rather than across all PRBs of the carrier, and CRS may be muted (e.g., not transmitted) outside of the central 6 PRBs of the carrier. Additionally, or alternatively, in CRS muting, CRS may be transmitted in all PRBs of a carrier on an as-needed basis, such as for paging, system information acquisition, resource allocation, during an active discontinuous reception (DRX) period of a UE, for PDSCH scheduling, and/or the like.

Although CRS muting may improve performance for UEs that support CRS muting (e.g., that are capable of being configured to monitor only the central 6 PRBs for CRS, rather than all PRBs of a carrier, and/or that are capable of being activated or deactivated to monitor all PRBs for CRS on an as-needed basis), some UEs (e.g., legacy UEs) may not support CRS muting. For example, these legacy UEs may be configured to monitor all PRBs of a carrier for CRS. Additionally, or alternatively, these legacy UEs may not be capable of being configured to monitor only the central 6 PRBs in some cases, and all PRBs of a carrier on an as-needed basis. As a result, these legacy UEs may not be capable of demodulating and/or decoding communications received on carriers that use CRS muting. Some techniques and apparatuses described herein prevent this negative impact to legacy UEs by preventing such legacy UEs, that do not support CRS muting, from camping on carriers that use CRS muting. This may improve network operations, conserve UE resources (e.g., battery power, processing resources, memory resources, and/or the like) that would otherwise be wasted by unnecessarily monitoring carriers and/or unnecessarily camping on a carrier, and/or the like. Additional details are described below.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
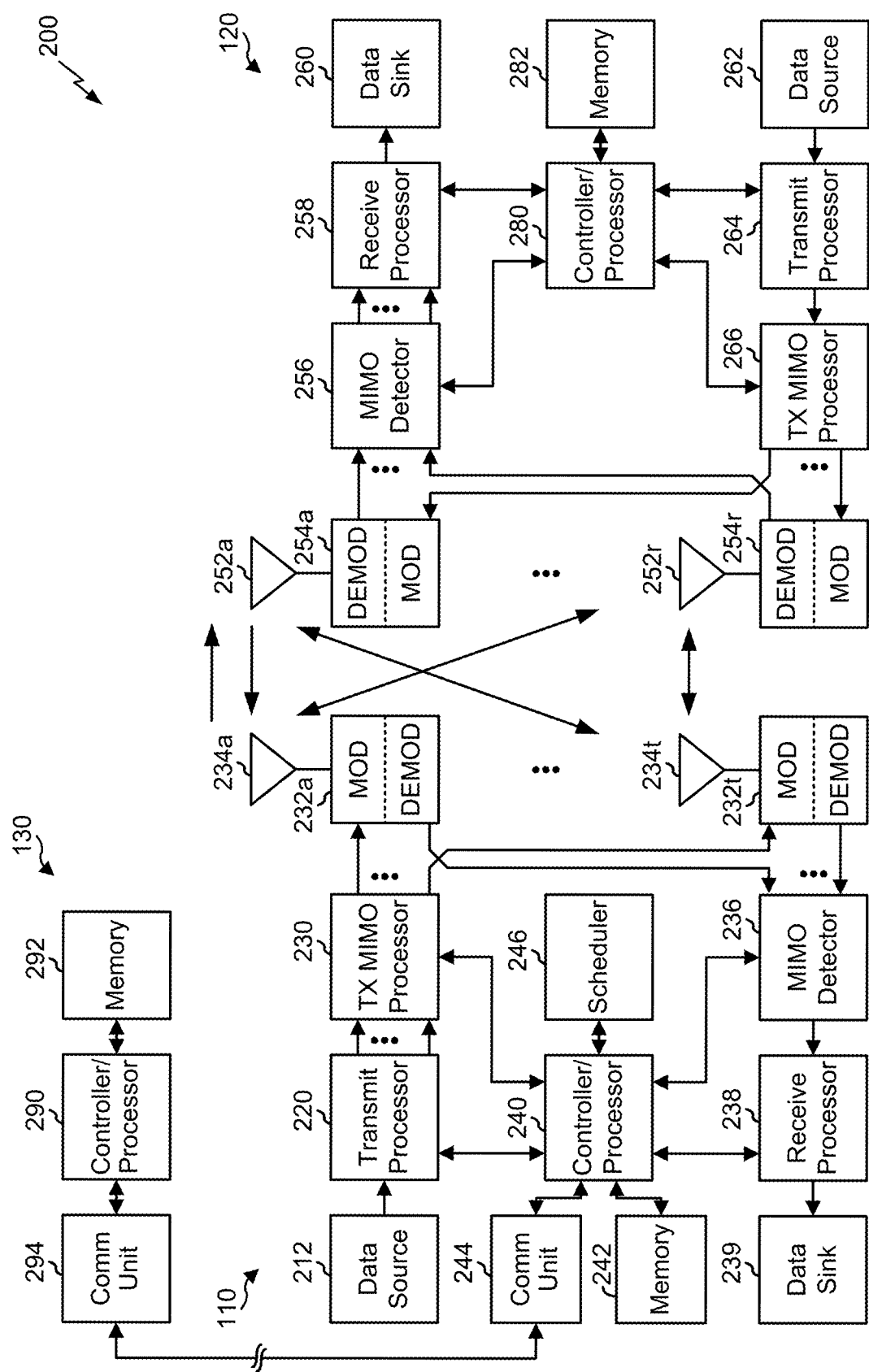
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with preventing UEs that do not support CRS muting from camping on CRS muted carriers, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, process 1900 of FIG. 19, process 2000 of FIG. 20, and/or other processes as described herein. Memories 242 and 282 may store data and program codes for base station 110 and UE 120, respectively. A scheduler 246 may schedule UEs for data transmission on the downlink and/or uplink.

Figure 11:
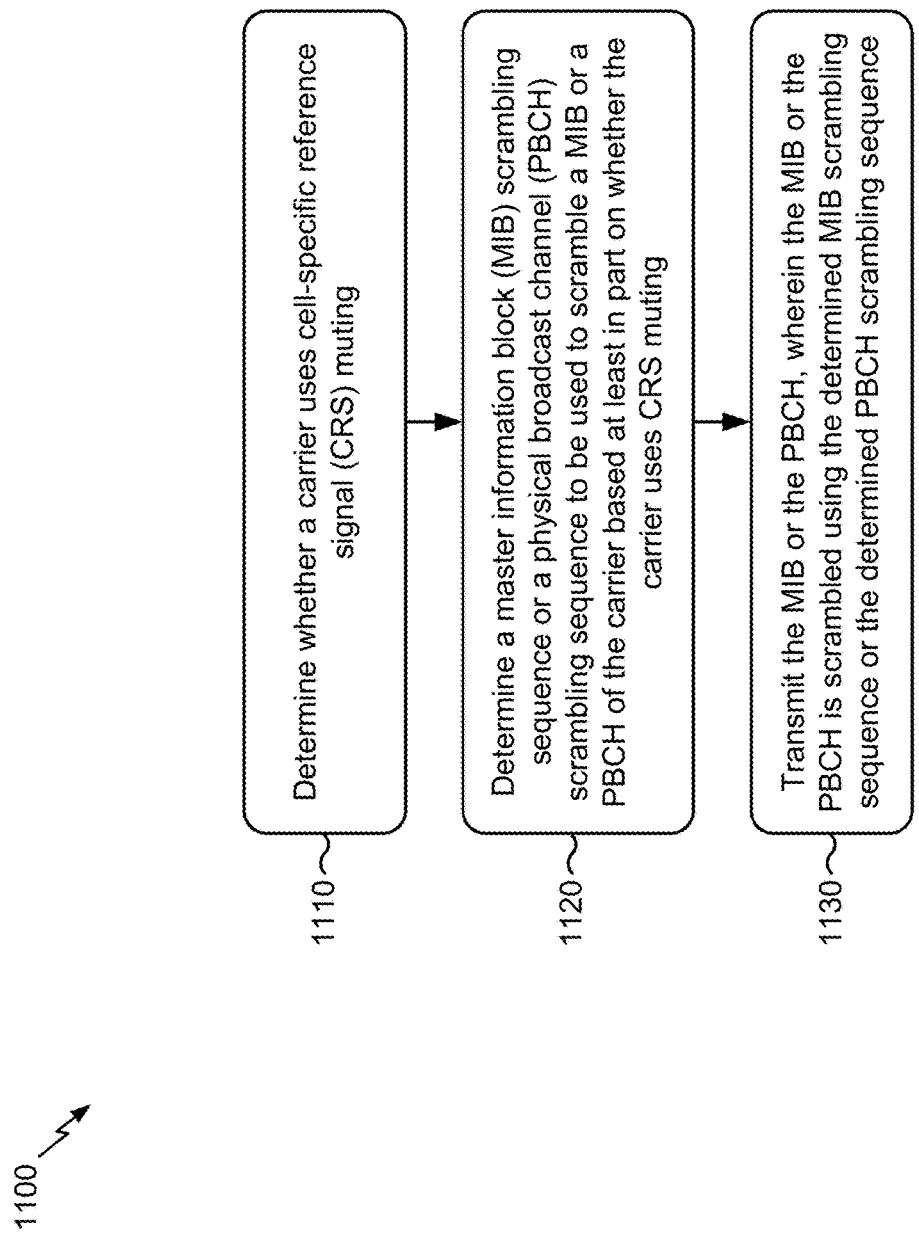
FIGS. 11-20 are diagrams illustrating example processes relating to preventing UEs that do not support CRS muting from camping on CRS muted carriers, in accordance with various aspects of the present disclosure.
Figure 12:
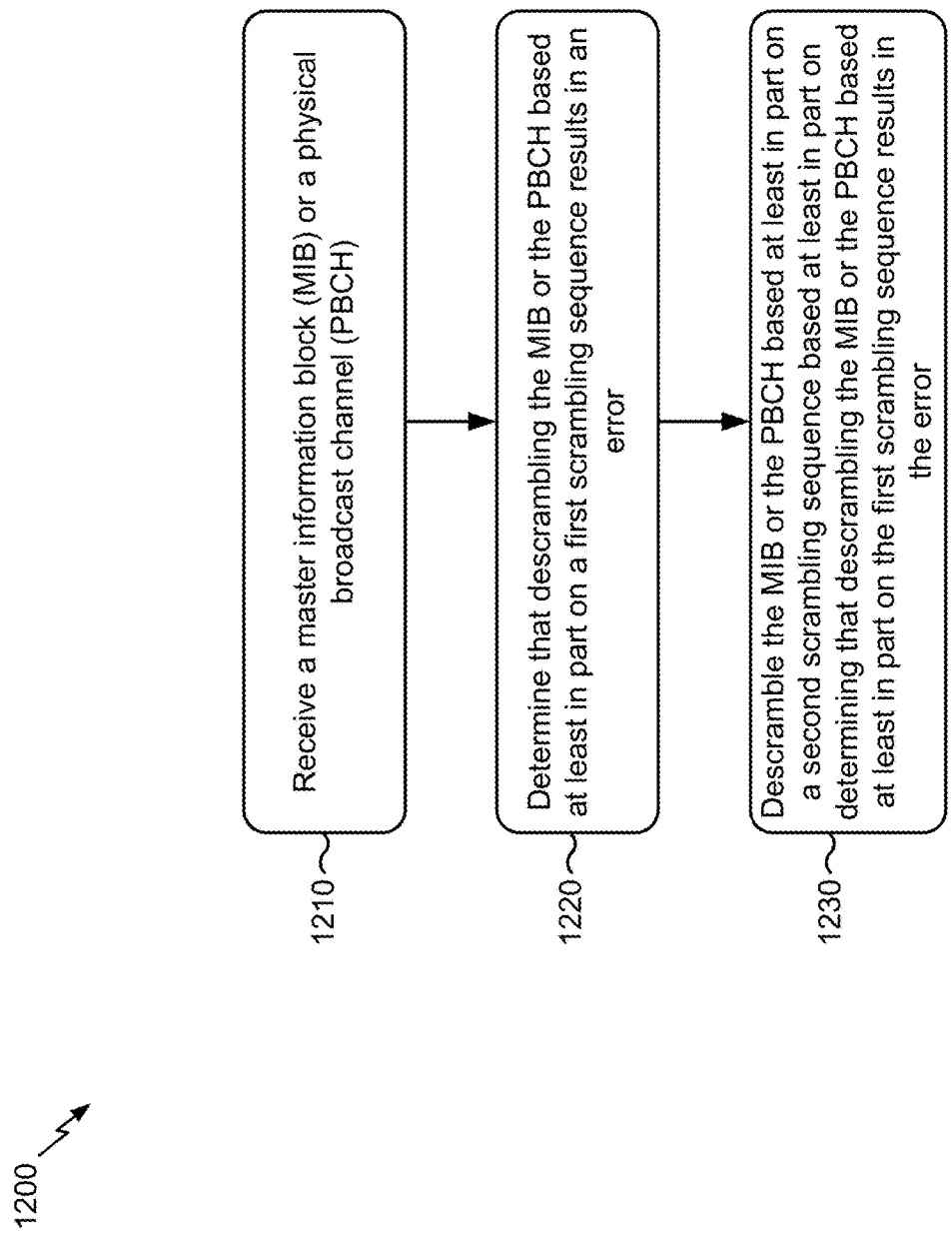
Figure 13:
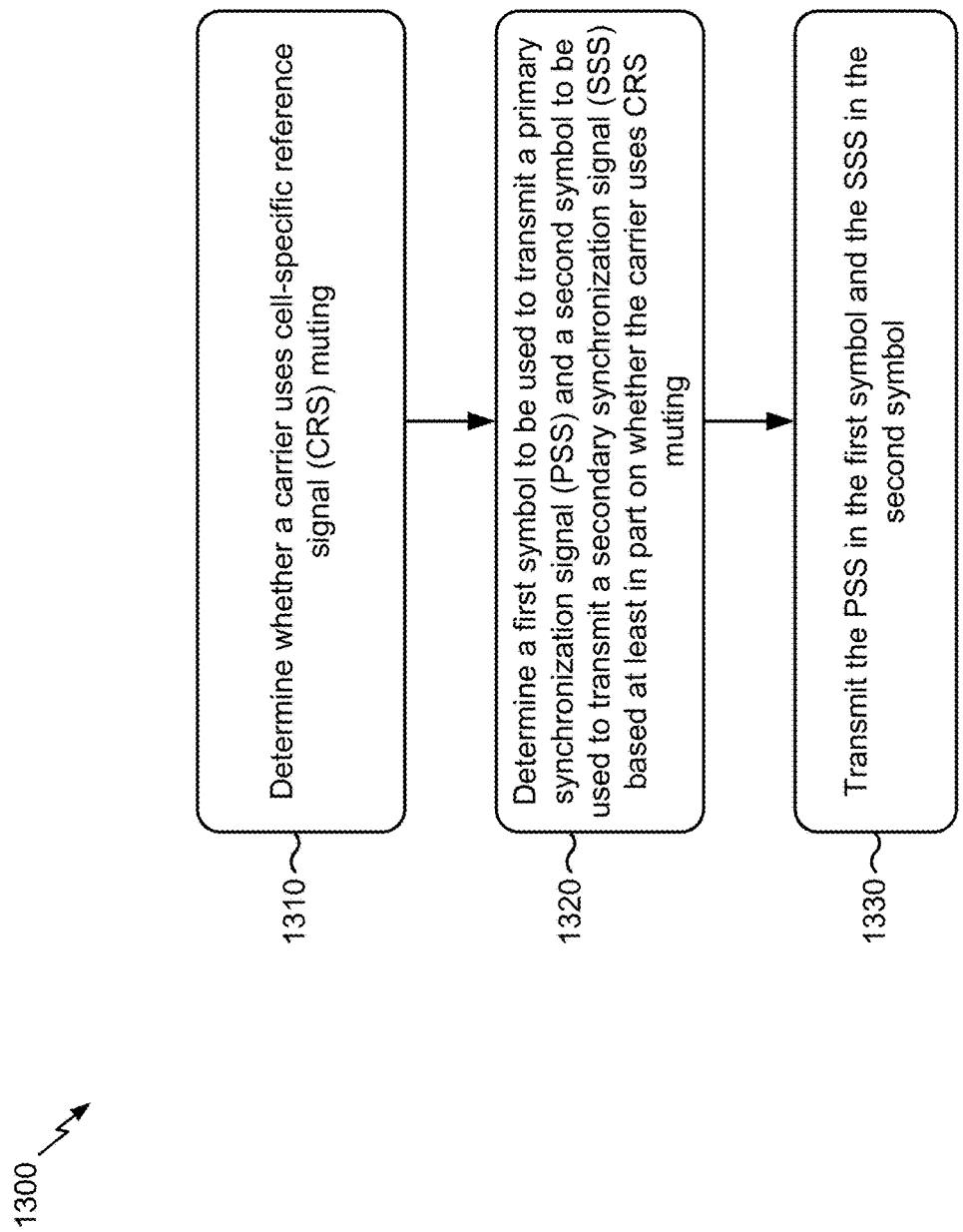
Figure 14:
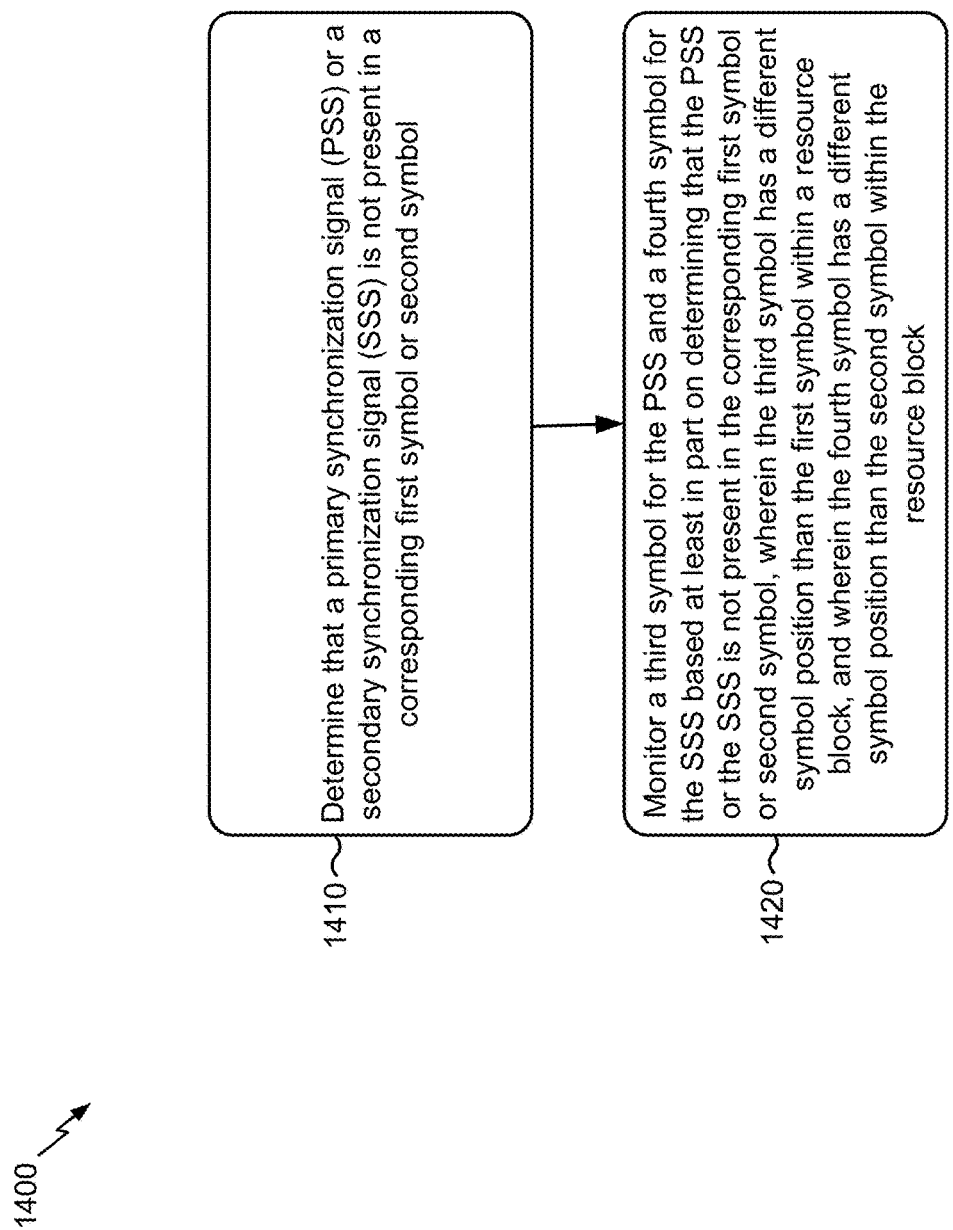
Figure 15:
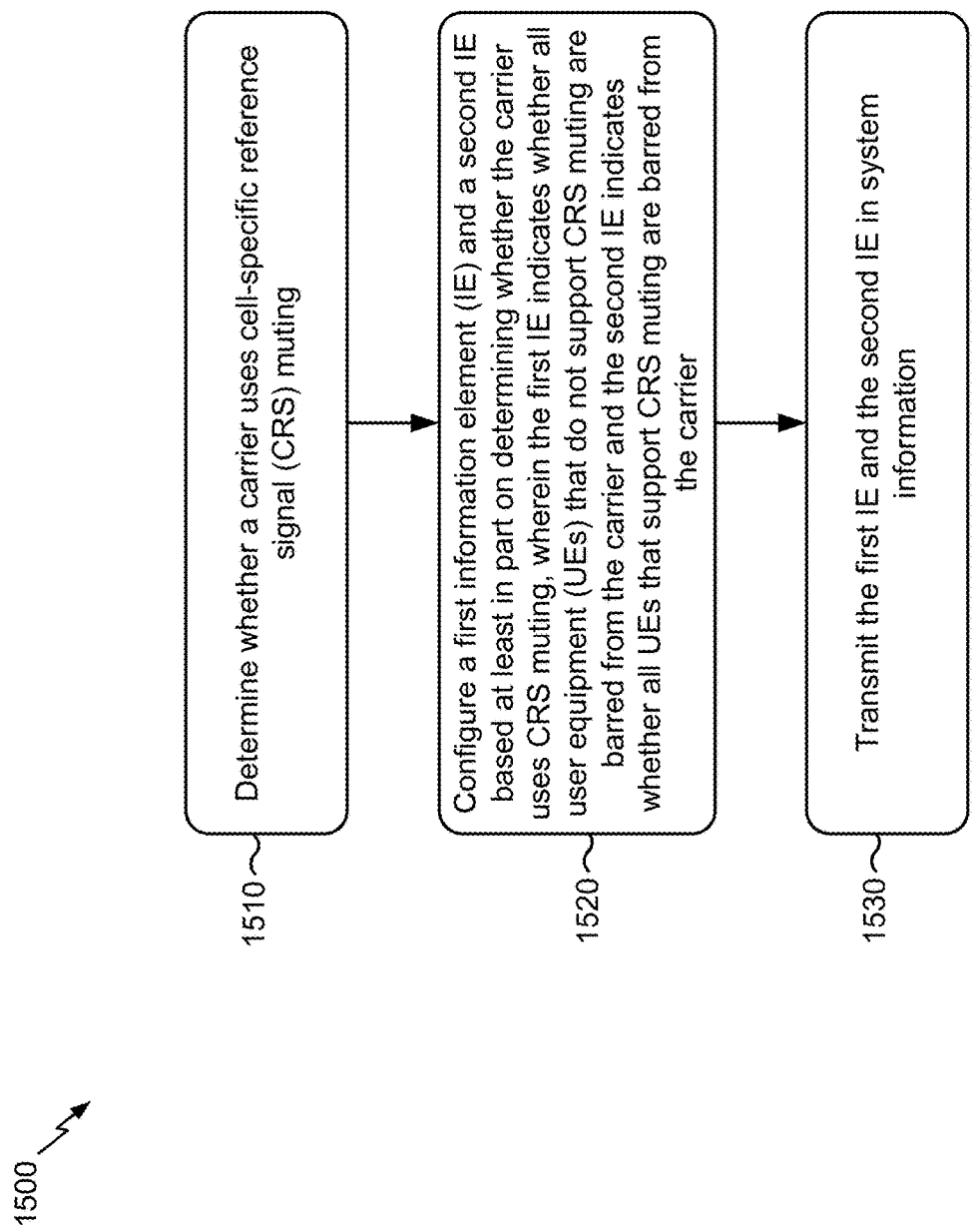
Figure 16:
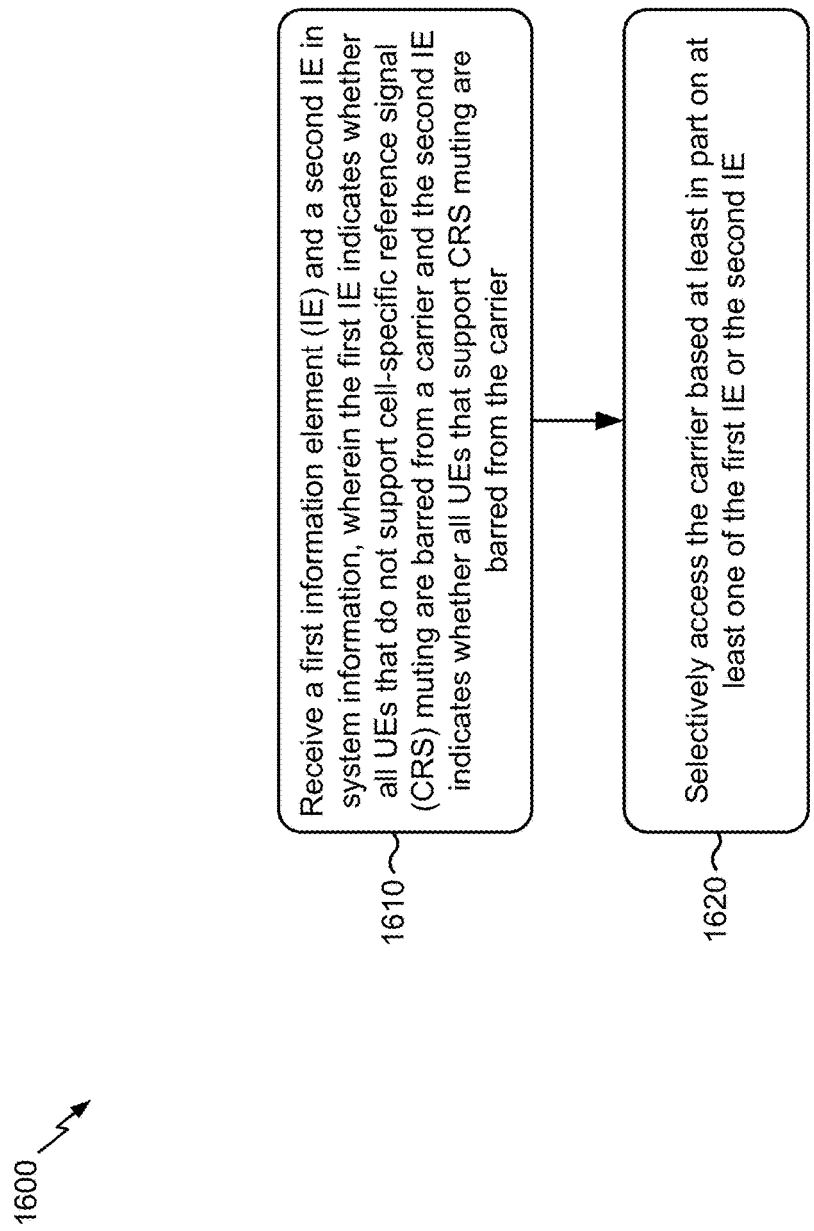
Figure 17:
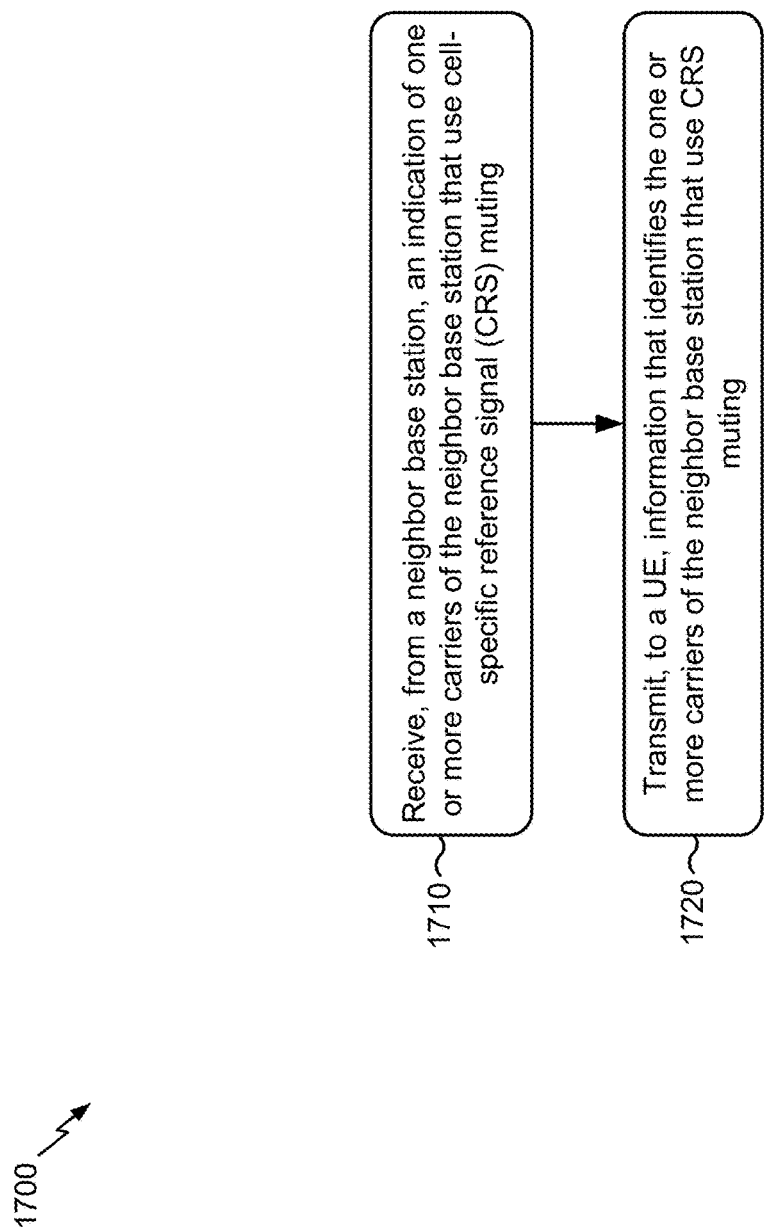
Figure 18:
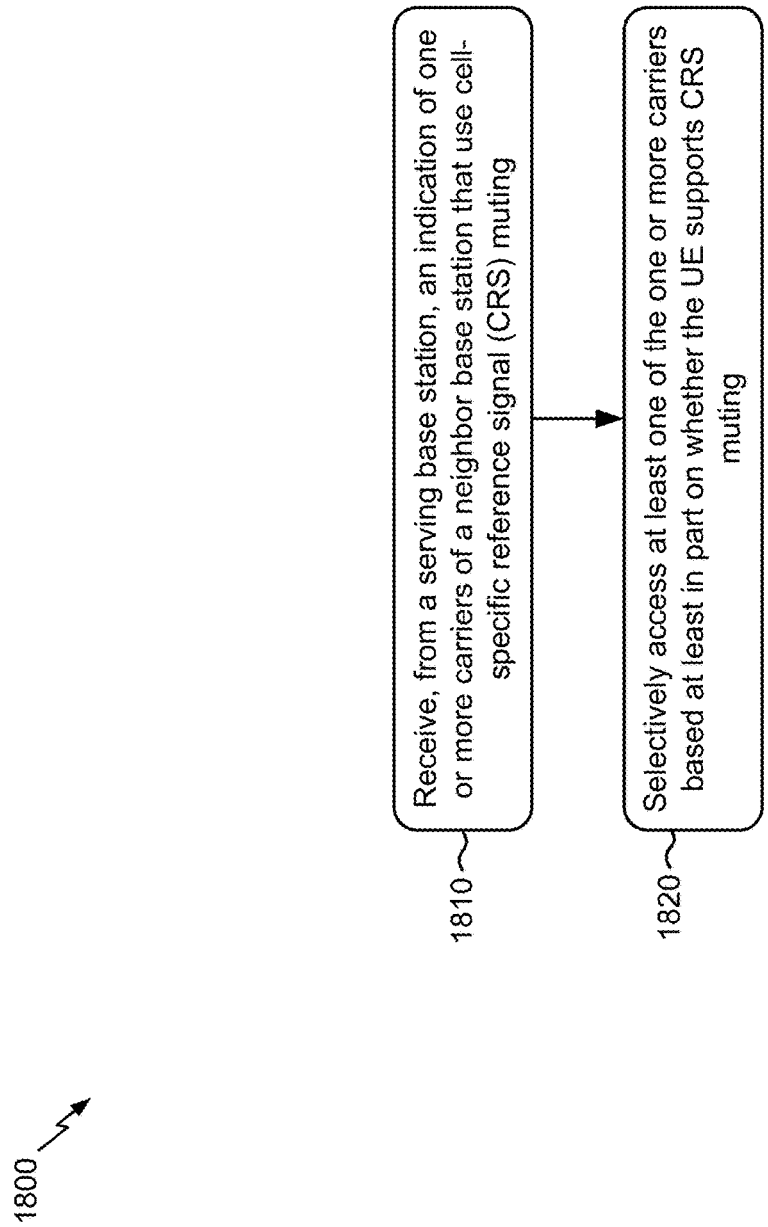
Figure 19:
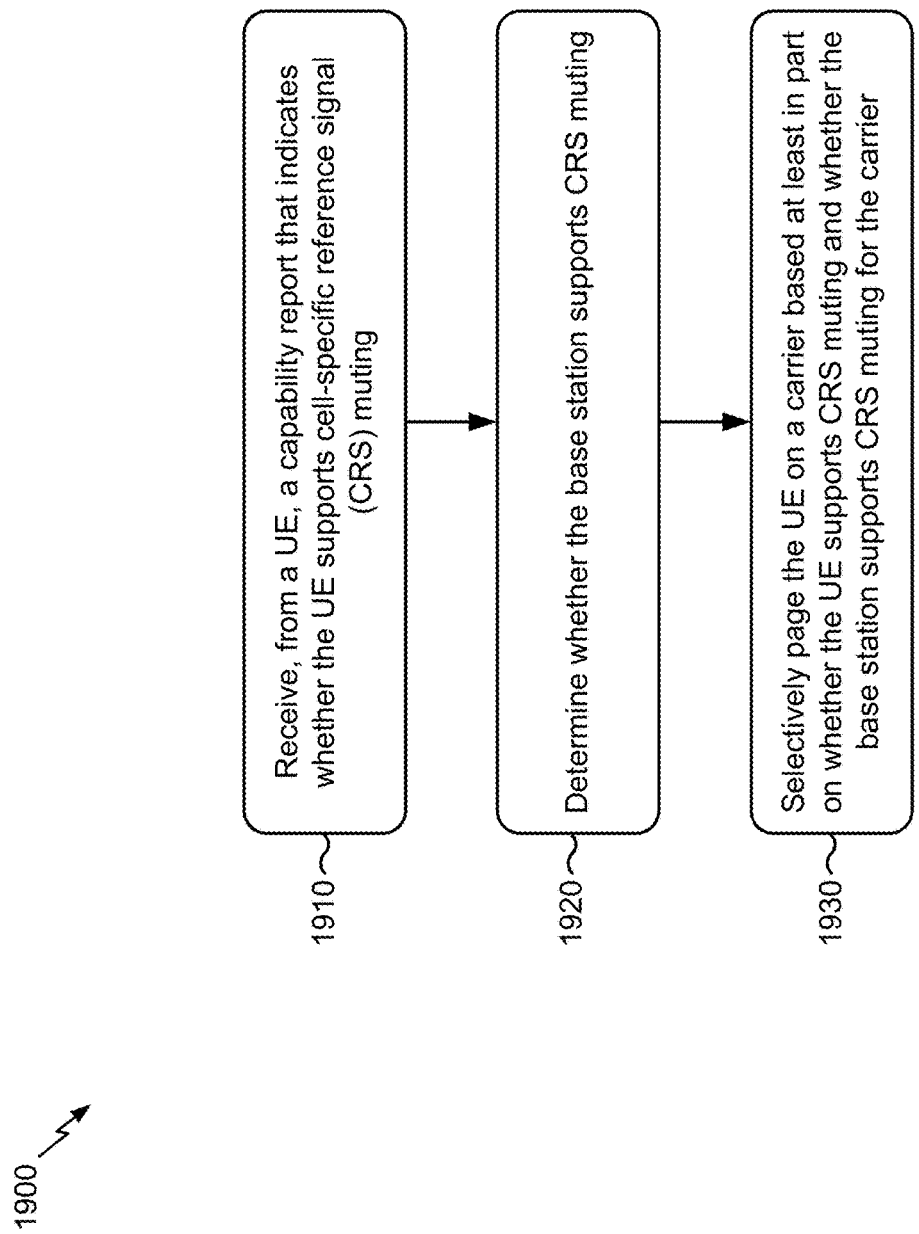
Figure 20:
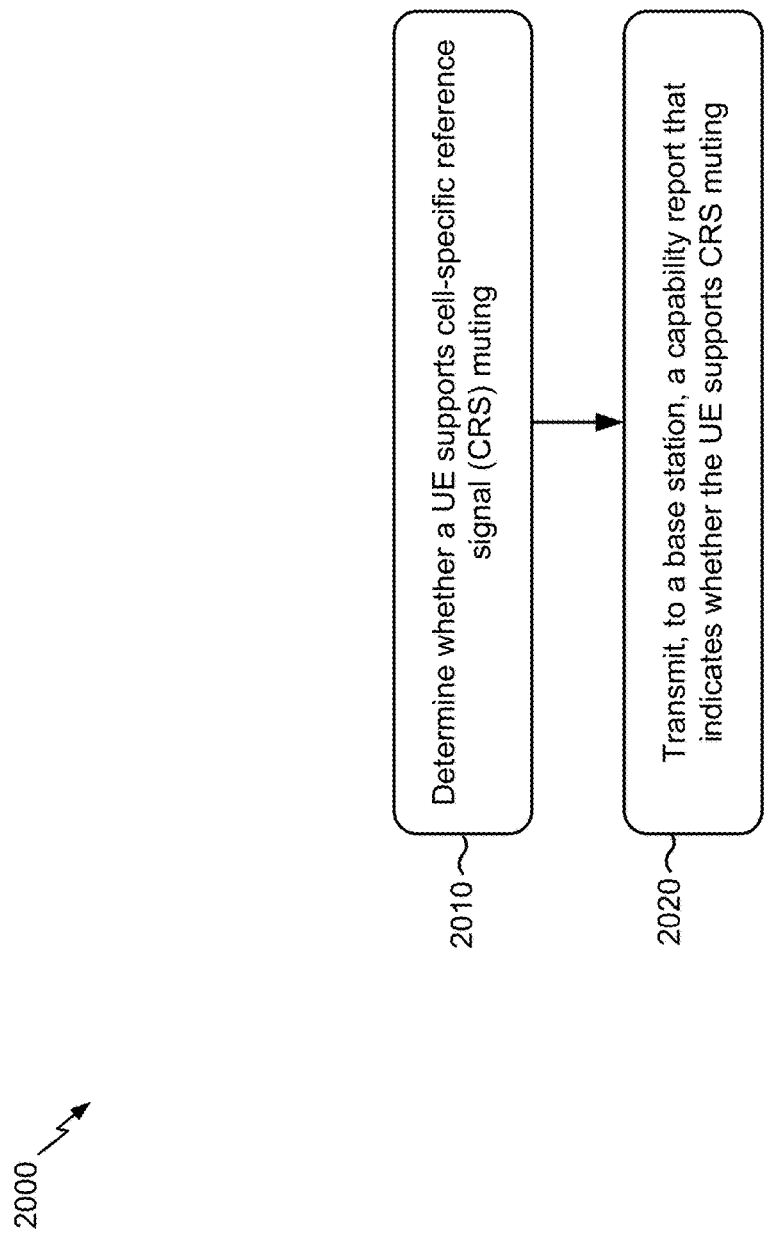

The stored program codes, when executed by processor 280 and/or other processors and modules at UE 120, may cause the UE 120 to perform operations described with respect to process 1200 of FIG. 12, process 1400 of FIG. 14, process 1600 of FIG. 16, process 1800 of FIG. 18, process 2000 of FIG. 20, and/or other processes as described herein. The stored program codes, when executed by processor 240 and/or other processors and modules at base station 110, may cause the base station 110 to perform operations described with respect to process 1100 of FIG. 11, process 1300 of FIG. 13, process 1500 of FIG. 15, process 1700 of FIG. 17, process 1900 of FIG. 19, and/or other processes as described herein. A scheduler 246 may schedule UEs for data transmission on the downlink and/or uplink.

In some aspects, UE 120 may include means for receiving a master information block (MIB) or a physical broadcast channel (PBCH); means for determining that descrambling the MIB or the PBCH based at least in part on a first scrambling sequence results in an error; means for descrambling the MIB or the PBCH based at least in part on a second scrambling sequence based at least in part on determining that descrambling the MIB or the PBCH based at least in part on the first scrambling sequence results in the error; and/or the like. Additionally, or alternatively, UE 120 may include means for determining that a primary synchronization signal (PSS) or a secondary synchronization signal (SSS) is not present in a corresponding first symbol or second symbol; means for monitoring a third symbol for the PSS and a fourth symbol for the SSS based at least in part on determining that the PSS or the SSS is not present in the corresponding first symbol or second symbol, wherein the third symbol has a different symbol position than the first symbol within a resource block, and wherein the fourth symbol has a different symbol position than the second symbol within the resource block; and/or the like.

Additionally, or alternatively, UE 120 may include means for receiving a first information element (IE) and a second IE, wherein the first IE indicates whether all UEs that do not support cell-specific reference signal (CRS) muting are barred from a carrier and the second IE indicates whether all UEs that support CRS muting are barred from the carrier; means for selectively accessing the carrier based at least in part on at least one of the first IE or the second IE; and/or the like. Additionally, or alternatively, UE 120 may include means for receiving, from a serving base station, an indication of one or more carriers of a neighbor base station that use cell-specific reference signal (CRS) muting; means for selectively accessing at least one of the one or more carriers based at least in part on whether the UE 120 supports CRS muting; and/or the like. Additionally, or alternatively, UE 120 may include means for determining whether the apparatus supports cell-specific reference signal (CRS) muting; means for transmitting, to a base station, a capability report that indicates whether the UE supports CRS muting; and/or the like. In some aspects, such means may include one or more components of UE 120 described in connection with FIG. 2.

In some aspects, base station 110 may include means for determining whether a carrier, associated with the base station 110, uses cell-specific reference signal (CRS) muting; means for determining a master information block (MIB) scrambling sequence or a physical broadcast channel (PBCH) scrambling sequence to be used to scramble a MIB or a PBCH of the carrier based at least in part on whether the carrier uses CRS muting; means for transmitting the MIB or the PBCH, wherein the MIB or the PBCH is scrambled using the determined MIB scrambling sequence or the determined PBCH scrambling sequence; and/or the like. Additionally, or alternatively, base station 110 may include means for determining whether a carrier, associated with the base station 110, uses cell-specific reference signal (CRS) muting; means for determining a first symbol to be used to transmit a primary synchronization signal (PSS) and a second symbol to be used to transmit a secondary synchronization signal (SSS) based at least in part on whether the carrier uses CRS muting; means for transmitting the PSS in the first symbol and the SSS in the second symbol; and/or the like.

Additionally, or alternatively, base station 110 may include means for determining whether a carrier, associated with the apparatus, uses cell-specific reference signal (CRS) muting; means for configuring a first information element (IE) and a second IE based at least in part on determining whether the carrier uses CRS muting, wherein the first IE indicates whether all user equipment (UEs) that do not support CRS muting are barred from the carrier and the second IE indicates whether all UEs that support CRS muting are barred from the carrier; means for transmitting the first IE and the second IE to a UE; and/or the like. Additionally, or alternatively, base station 110 may include means for receiving, from a neighbor base station, an indication of one or more carriers of the neighbor base station that use cell-specific reference signal (CRS) muting; means for transmitting, to a user equipment (UE), information that identifies the one or more carriers of the neighbor base station that use CRS muting; and/or the like. Additionally, or alternatively, base station 110 may include means for receiving, from a user equipment (UE), a capability report that indicates whether the UE supports cell-specific reference signal (CRS) muting; means for determining whether the base station 110 supports CRS muting; means for selectively paging the UE on a carrier based at least in part on whether the UE supports CRS muting and whether the base station 110 supports CRS muting for the carrier; and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples are possible and may differ from what was described with regard to FIG. 2.

Figure 3A:
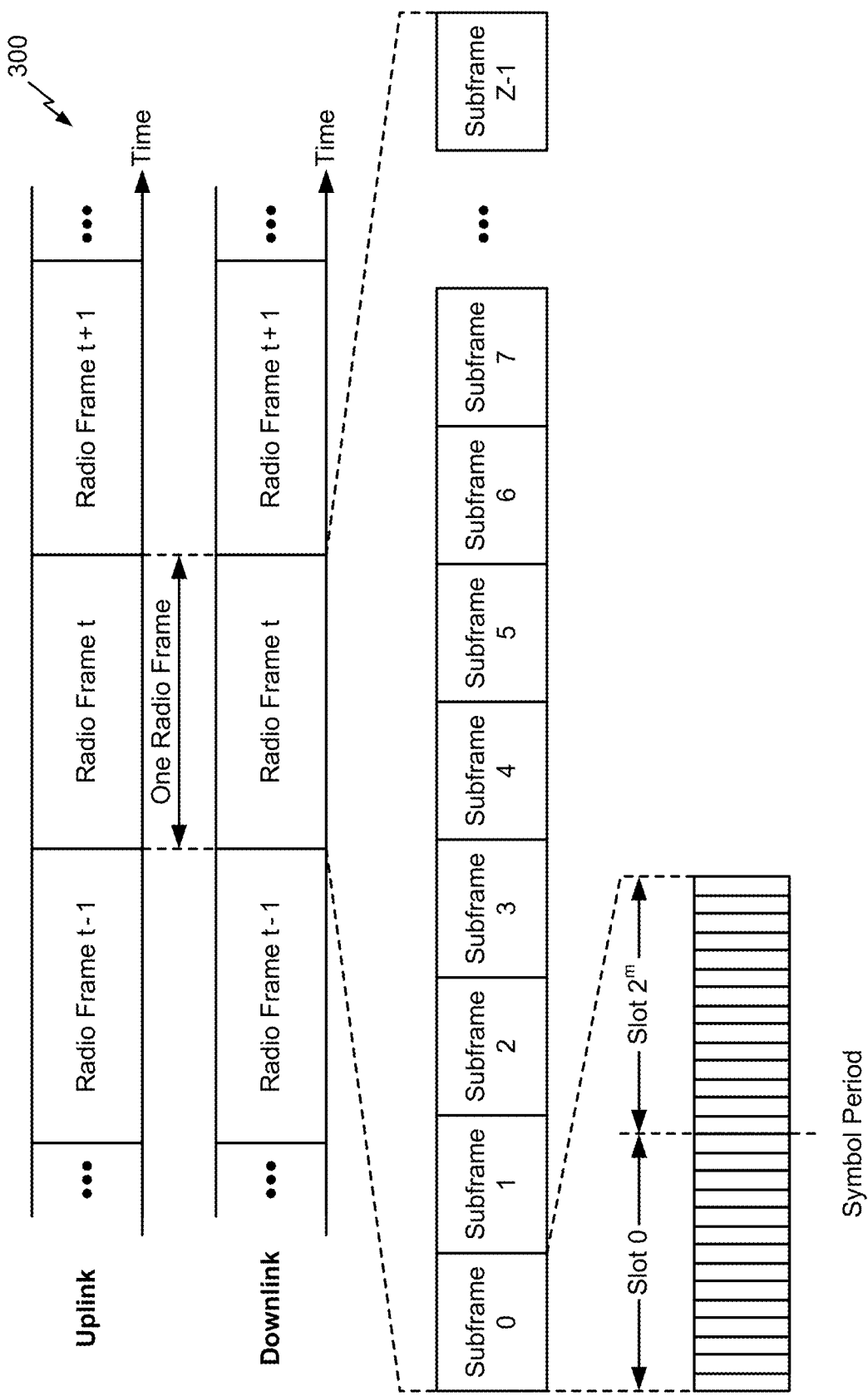
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
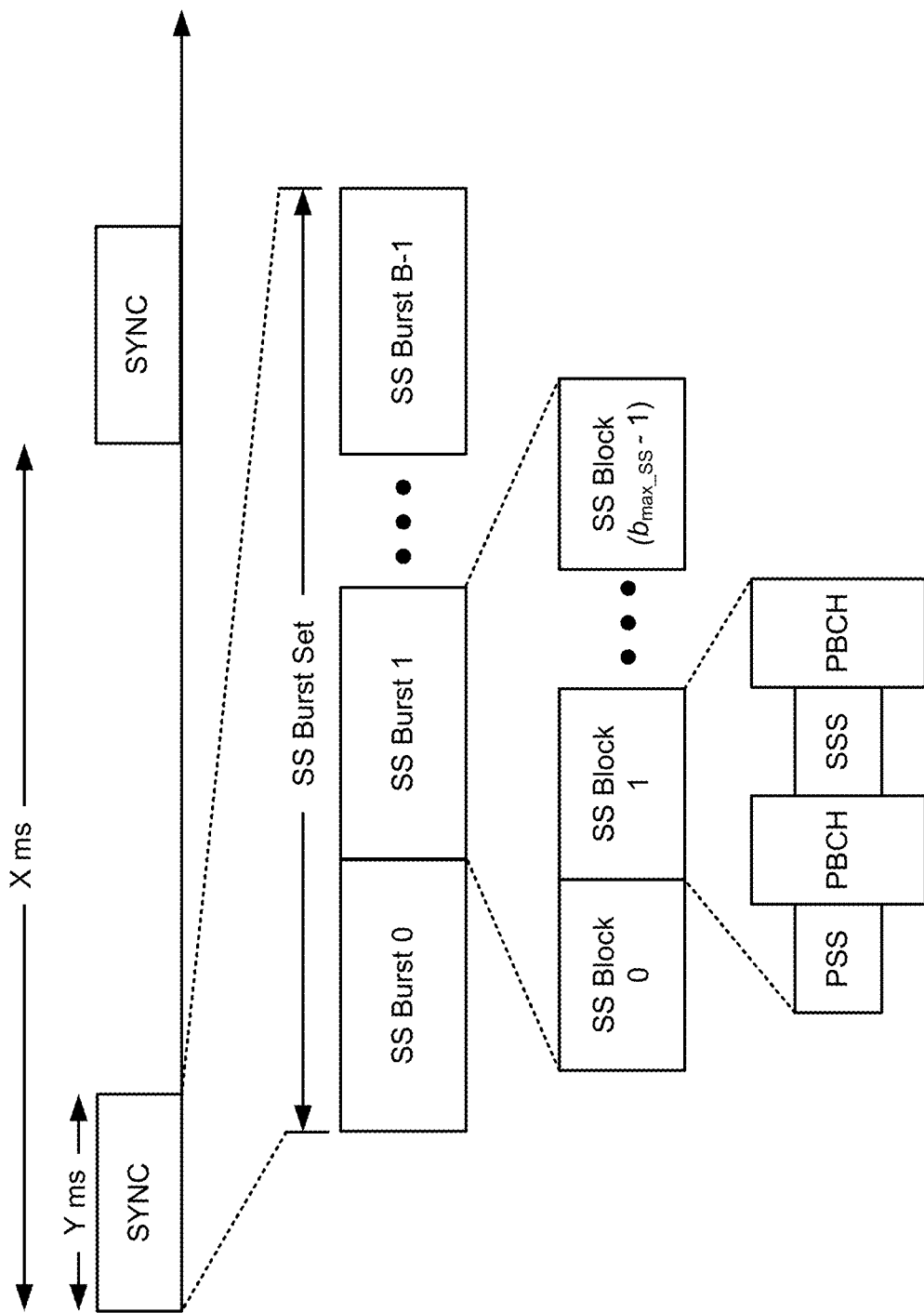
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples are possible and may differ from what was described with regard to FIGS. 3A and 3B.

Figure 4:
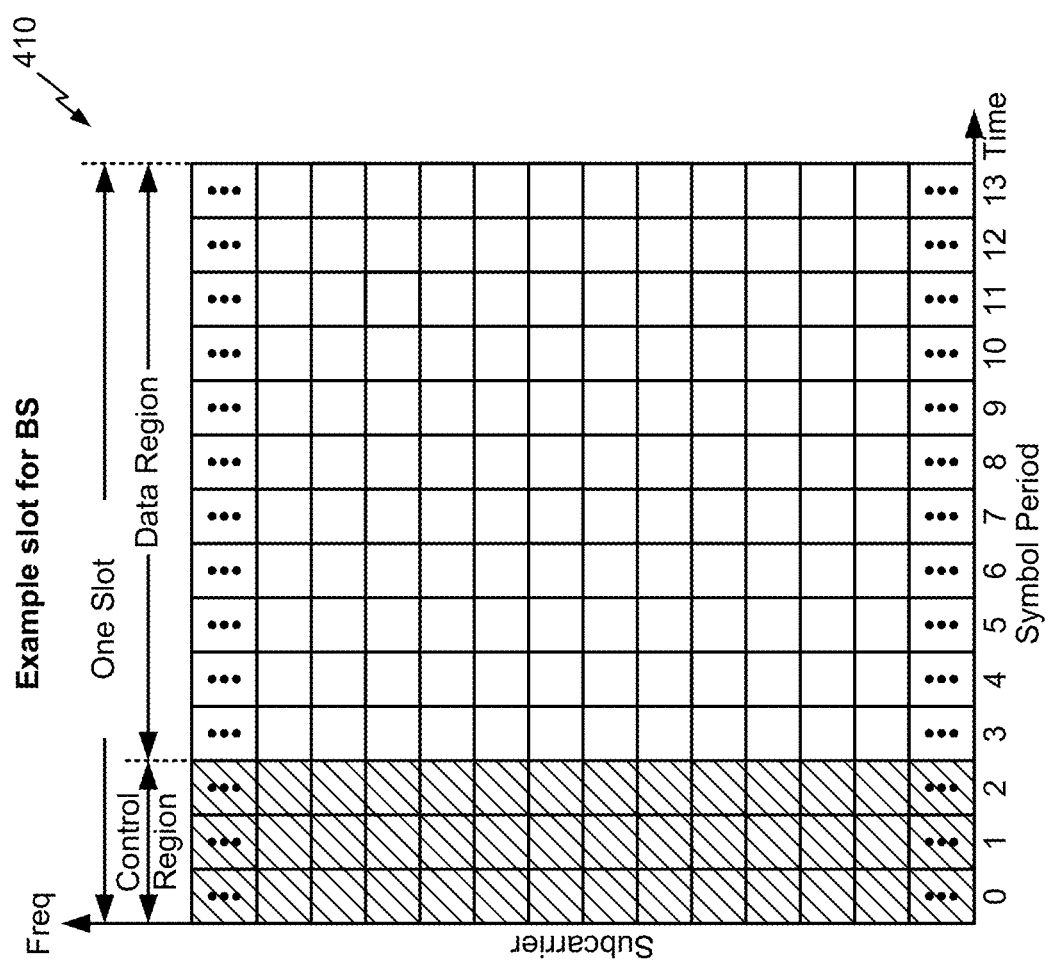
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q E {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

In some radio access technologies, such as LTE, a cell-specific reference signal (CRS) may be periodically broadcast by a base station, such as in every subframe (e.g., every 1 ms). For example, the CRS may be a pilot signal inserted into a downlink signal. The CRS may be broadcast across all resource blocks (RBs) in every carrier frequency, and may be used by a UE for timing and frequency synchronization, for radio resource management (RRM) measurements (e.g., RSRP measurements, RSRQ measurements, SINR measurements, and/or the like), for time domain and frequency domain channel estimation, for coherent demodulation, for channel state information (CSI) measurements (e.g., a channel quality indicator (CQI) measurement, a precoding matrix indicator (PMI) measurement, a rank indicator (RI) measurement, and/or the like), and/or the like.

This periodic broadcasting of CRS across all RBs by a base station may cause interference to neighbor base stations, and may negatively impact demodulation performance of neighbor cell UEs, neighbor cell capacity, RRM measurements in neighbor cells, CSI measurements in neighbor cells, and/or the like. Furthermore, broadcasting CRS across all RBs may consume significant network resource overhead. To mitigate these issues, CRS muting may be used. In CRS muting, CRS may be broadcast in only the central 6 physical resource blocks (PRBs) of carrier bandwidth, rather than across all PRBs of the carrier, and CRS may be muted (e.g., not transmitted) outside of the central 6 PRBs of the carrier. Additionally, or alternatively, in CRS muting, CRS may be transmitted in all PRBs of a carrier on an as-needed basis, such as for paging, system information acquisition, resource allocation, during an active discontinuous reception (DRX) period of a UE, for PDSCH scheduling, and/or the like.

Although CRS muting may improve performance for UEs that support CRS muting (e.g., that are capable of being configured to monitor only the central 6 PRBs for CRS, rather than all PRBs of a carrier, that are capable of being activated or deactivated to monitor all PRBs for CRS on an as-needed basis, that are capable of communicating on carriers that use CRS muting, and/or the like), some UEs (e.g., legacy UEs) may not support CRS muting (e.g., may not be capable of communicating on carriers that use CRS muting). For example, these legacy UEs may be configured to monitor all PRBs of a carrier for CRS. Additionally, or alternatively, these legacy UEs may not be capable of being configured to monitor only the central 6 PRBs in some cases, and all PRBs of a carrier on an as-needed basis. As a result, these legacy UEs may not be capable of demodulating and/or decoding communications received on carriers that use CRS muting. Some techniques and apparatuses described herein prevent this negative impact to legacy UEs by preventing such legacy UEs, that do not support CRS muting, from camping on carriers that use CRS muting. Additional details are described below.

Figure 5:
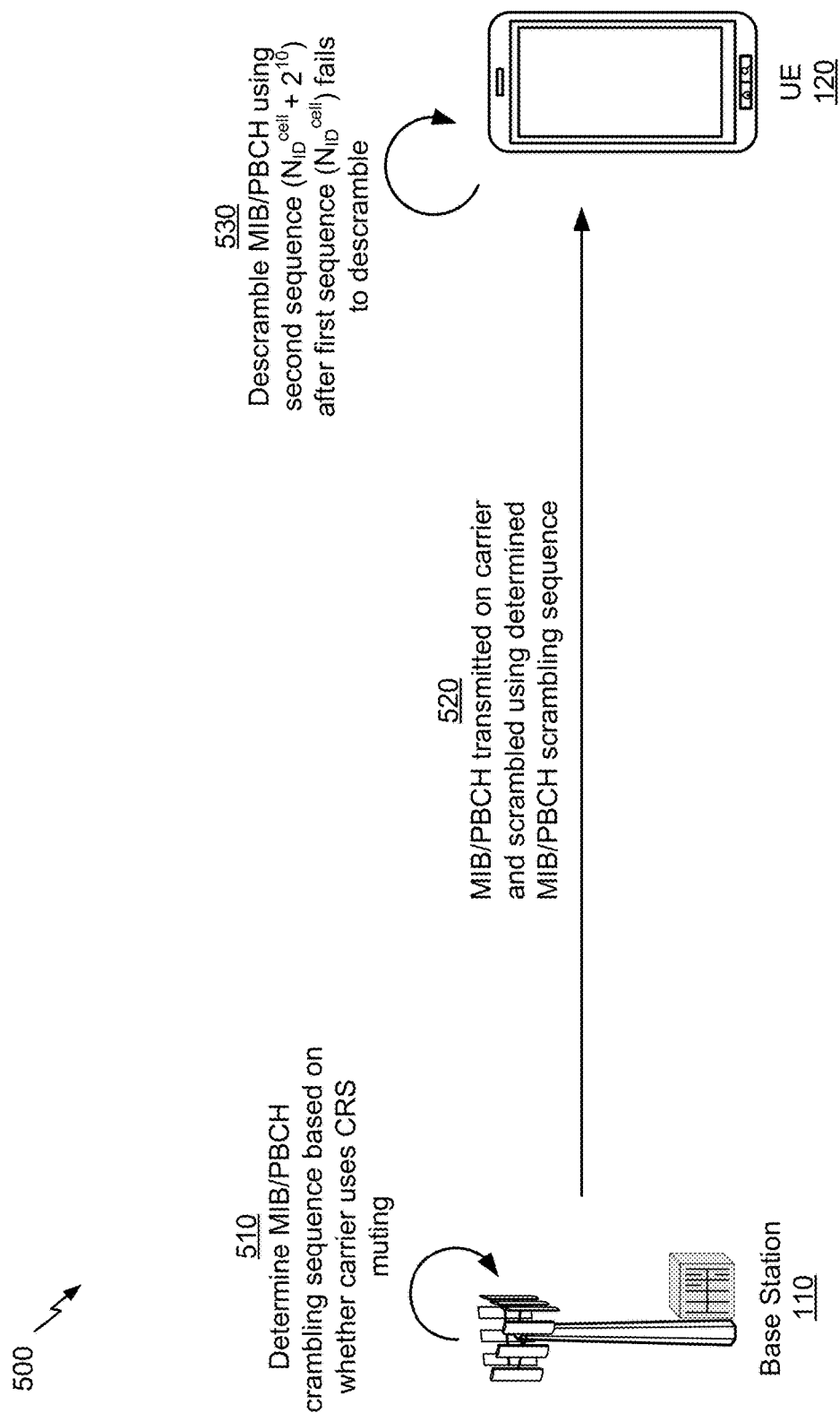
FIGS. 5-10 are diagrams illustrating examples relating to preventing UEs that do not support CRS muting from camping on CRS muted carriers, in accordance with various aspects of the present disclosure.

FIG. 5 is a diagram illustrating an example 500 relating to preventing UEs that do not support CRS muting from camping on CRS muted carriers, in accordance with various aspects of the present disclosure.

As shown by reference number 510, a base station 110 may determine a master information block (MIB) scrambling sequence and/or physical broadcast channel (PBCH) scrambling sequence to be used to scramble a MIB and/or PBCH of a carrier based at least in part on whether the carrier uses CRS muting. For example, the base station 110 may determine whether a carrier of the base station 110 uses CRS muting. The base station 110 may use a first MIB and/or PBCH scrambling sequence if the carrier does not use CRS muting, or may use a second MIB and/or PBCH scrambling sequence if the carrier uses CRS muting.

In some aspects, the first MIB and/or PBCH scrambling sequence may be generated based at least in part on a first scrambling sequence initialization (e.g., $c_{init}$), which may be generated using a physical cell identifier, represented by $N_{ID}^{cell}$. For example, when the carrier does not use CRS muting, the base station 110 may generate the MIB scrambling sequence and/or the PBCH scrambling sequence based at least in part on $c_{init}=N_{ID}^{cell}$, which is consistent with legacy LTE operations.

In some aspects, the second MIB and/or PBCH scrambling sequence may be generated based at least in part on a second scrambling sequence initialization (e.g., $c_{init}$), which may be generated using a physical cell identifier plus a predefined value, such as $N_{ID}^{cell}+2^{10}$. For example, when the carrier uses CRS muting, the base station 110 may generate the MIB scrambling sequence and/or the PBCH scrambling sequence based at least in part on $c_{init}=N_{ID}^{cell}+2^{10}$, to differentiate from legacy LTE operations.

As shown by reference number 520, the base station 110 may transmit, and a UE 120 may receive, the MIB and/or PBCH on the carrier. As described above, the MIB and/or the PBCH may be scrambled using the determined MIB and/or PBCH scrambling sequence. Thus, the MIB and/or PBCH may be scrambled using different scrambling sequences based at least in part on whether the carrier, via which the MIB and/or PBCH is transmitted, uses CRS muting.

As shown by reference number 530, the UE 120 may determine that a first scrambling sequence failed to properly descramble the MIB and/or the PBCH, and may descramble the MIB and/or the PBCH using a second scrambling sequence based at least in part on determining that the first descrambling sequence failed to properly descramble the MIB and/or the PBCH. For example, the UE 120 may first attempt to descramble the MIB and/or the PBCH using an assumption (e.g., a hypothesis) that the first MIB scrambling sequence and/or the first PBCH scrambling sequence, described above, was used to scramble the MIB and/or the PBCH. If such descrambling fails (e.g., results in an error), then the UE 120 may attempt to descramble the MIB and/or the PBCH using an assumption that the second MIB scrambling sequence and/or the second PBCH scrambling sequence, described above, was used to scramble the MIB and/or the PBCH. In some aspects, the UE 120 may attempt to descramble the MIB and/or PBCH with both scrambling sequences (e.g. the one initialized by $c_{init}=N_{ID}^{cell}+2^{10}$, corresponding to a carrier that supports CRS muting, and the one initialized by $c_{init}=N_{ID}^{cell}$, corresponding to the legacy carrier).

In some aspects, the UE 120 may descramble the MIB based at least in part on the second scrambling sequence only if the UE 120 supports CRS muting (e.g., only if the UE 120 is capable of communicating on carriers that use CRS muting). For example, UEs 120 that support CRS muting may be configured to perform the sequential descrambling described above, whereas UEs 120 that do not support CRS muting may be configured to attempt descrambling based at least in part on only the first scrambling sequence, and not the second scrambling sequence. In this case, a UE 120 that does not support CRS muting may fail to descramble the MIB of a carrier that supports CRS muting because the MIB uses a second descrambling sequence not used by the UE 120 to attempt to descramble the MIB. As a result, UEs 120 that do not support CRS muting may be unable to access (e.g., read system information of, camp on, and/or the like) a carrier that supports CRS muting, thereby preventing negative impacts described elsewhere herein.

As indicated above, FIG. 5 is provided as an example. Other examples are possible and may differ from what was described with respect to FIG. 5.

Figure 6:
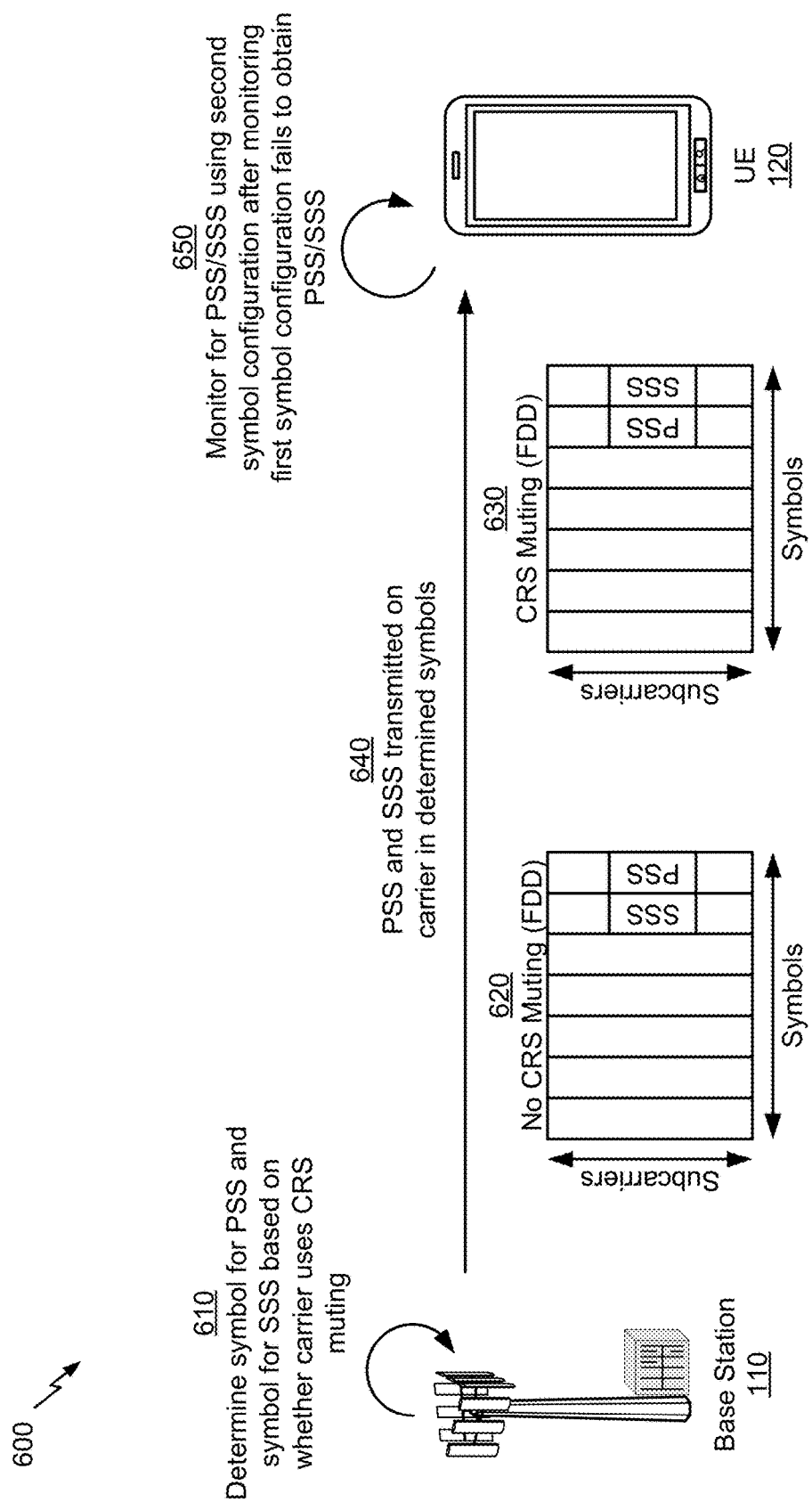

FIG. 6 is a diagram illustrating another example 600 relating to preventing UEs that do not support CRS muting from camping on CRS muted carriers, in accordance with various aspects of the present disclosure.

As shown by reference number 610, a base station 110 may determine a symbol in which a PSS is to be transmitted and/or may determine another symbol in which an SSS is to be transmitted based at least in part on whether a carrier uses CRS muting. For example, the base station 110 may determine whether a carrier of the base station 110 uses CRS muting. In some aspects, the base station 110 may use a different symbol for transmission of the PSS if the carrier uses CRS muting versus if the carrier does not use CRS muting. Additionally, or alternatively, the base station 110 may use a different symbol for transmission of the SSS if the carrier uses CRS muting versus if the carrier does not use CRS muting.

For example, as shown by reference number 620, in a frequency division duplexing (FDD) configuration, if the carrier does not use CRS muting, then the PSS may be transmitted in the last symbol of a slot, and the SSS may be transmitted in the second-to-last symbol of the slot (e.g., immediately preceding the symbol that carries the PSS). However, as shown by reference number 630, in the FDD configuration, if the carrier uses CRS muting, then the SSS may be transmitted in the last symbol of a slot, and the PSS may be transmitted in the second-to-last symbol of the slot (e.g., immediately preceding the symbol that carries the SSS). In some aspects, in the FDD configuration, both the PSS and the SSS may be transmitted in slot 0 (e.g., the first slot) and slot 10 (e.g., the eleventh slot) of a frame.

As another example, in a time division duplexing (TDD) configuration, if the carrier does not use CRS muting, then the SSS may be transmitted in the last symbol of a slot, and the PSS may be transmitted in the third symbol of the next successive slot (e.g., immediately after the slot that carries the SSS). In this case, the SSS may be transmitted in subframe 0 and slot 1 (e.g., the first subframe and second slot) of a frame, and the PSS may be transmitted in subframe 1 and slot 2 (e.g., the second subframe and third slot) of the frame. Furthermore, the SSS may be transmitted in subframe 5 and slot 11 (e.g., the sixth subframe and twelfth slot) of a frame, and the PSS may be transmitted in subframe 6 and slot 12 (e.g., the seventh subframe and thirteenth slot) of the frame. However, in the TDD configuration, if the carrier uses CRS muting, then the PSS may be transmitted in the last symbol of a slot, and the SSS may be transmitted in the third symbol of the next successive slot (e.g., immediately after the slot that carries the PSS). In this case, the PSS may be transmitted in subframe 0 and slot 1 (e.g., the first subframe and second slot) of a frame, and the SSS may be transmitted in subframe 1 and slot 2 (e.g., the second subframe and third slot) of the frame. Furthermore, the PSS may be transmitted in subframe 5 and slot 11 (e.g., the sixth subframe and twelfth slot) of a frame, and the SSS may be transmitted in subframe 6 and slot 12 (e.g., the seventh subframe and thirteenth slot) of the frame.

As shown by reference number 640, the base station 110 may transmit, and the UE 120 may receive, the PSS and the SSS in the determined symbols. For example, as described above, the symbols in which the PSS and SSS are transmitted may be swapped when the carrier uses CRS muting versus when the carrier does not use CRS muting. In this case, a first symbol configuration may be used for transmission of the PSS and the SSS when the carrier does not use CRS muting, and a second symbol configuration may be used for transmission of the PSS and the SSS when the carrier uses CRS muting, as described above.

As shown by reference number 650, the UE 120 may determine that the PSS and/or the SSS were not obtained using a first symbol configuration, and may monitor for the PSS and/or the SSS using a second symbol configuration based at least in part on determining that the PSS and/or the SSS were not obtained using the first symbol configuration. For example, the UE 120 may monitor for the PSS in a first symbol and may monitor for the SSS in a second symbol. If this monitoring fails to obtain the PSS and/or the SSS (e.g., because the PSS or the SSS is not present in the corresponding first or second symbols), then the UE 120 may monitor for the PSS in a third symbol and/or may monitor for the SSS in a fourth symbol.

As described above, the first symbol and the second symbol may follow a first symbol configuration, while the third symbol and the fourth symbol may follow a second symbol configuration. For example, the third symbol may be in a different symbol position than the first symbol (e.g., within an RB, a subframe, a slot, and/or the like), and the fourth symbol may be in a different symbol position than the second symbol. In the case where the symbols for the PSS and the SSS are swapped in the second symbol configuration as compared to the first symbol configuration, the third symbol may be in the same symbol position as the second symbol, and the fourth symbol may be in the same symbol position as the first symbol. In this case, the UE 120 may monitor the first symbol and the second symbol twice, but may interpret the received signals differently (e.g., PSS vs. SSS).

Additionally, or alternatively, the UE 120 may initially attempt to decode a signal in the first symbol with an assumption that the signal is a PSS. If this fails, then the UE 120 may attempt to decode the signal in the first symbol with an assumption that the signal is an SSS. Similarly, the UE 120 may initially attempt to decode a signal in the second symbol with an assumption that the signal is an SSS. If this fails, then the UE 120 may attempt to decode the signal in the second symbol with an assumption that the signal is a PSS.

In some aspects, the UE 120 may monitor the third symbol for the PSS and the fourth symbol for the SSS only if the UE 120 supports CRS muting (e.g., only if the UE 120 is capable of communicating on carriers that use CRS muting). Additionally, or alternatively, the UE 120 may attempt to obtain the PSS and/or the SSS using the second symbol configuration only if the UE 120 supports CRS muting. Additionally, or alternatively, the UE 120 may use a different decoding assumption to obtain the PSS and/or the SSS in the first and/or second symbol only if the UE 120 supports CRS muting. For example, UEs 120 that support CRS muting may be configured to perform the techniques described above, whereas UEs 120 that do not support CRS muting may be configured to attempt to obtain the PSS in only the first symbol and the SSS in only the second symbol. In this case, a UE 120 that does not support CRS muting may fail to obtain the PSS and/or the SSS of a carrier that supports CRS muting (e.g., due to an error, such as when the symbol positions of the PSS and the SSS are swapped). As a result, UEs 120 that do not support CRS muting may be unable to access (e.g., read system information of, camp on, and/or the like) a carrier that supports CRS muting, thereby preventing negative impacts described elsewhere herein.

As indicated above, FIG. 6 is provided as an example. Other examples are possible and may differ from what was described with respect to FIG. 6.

Figure 7:
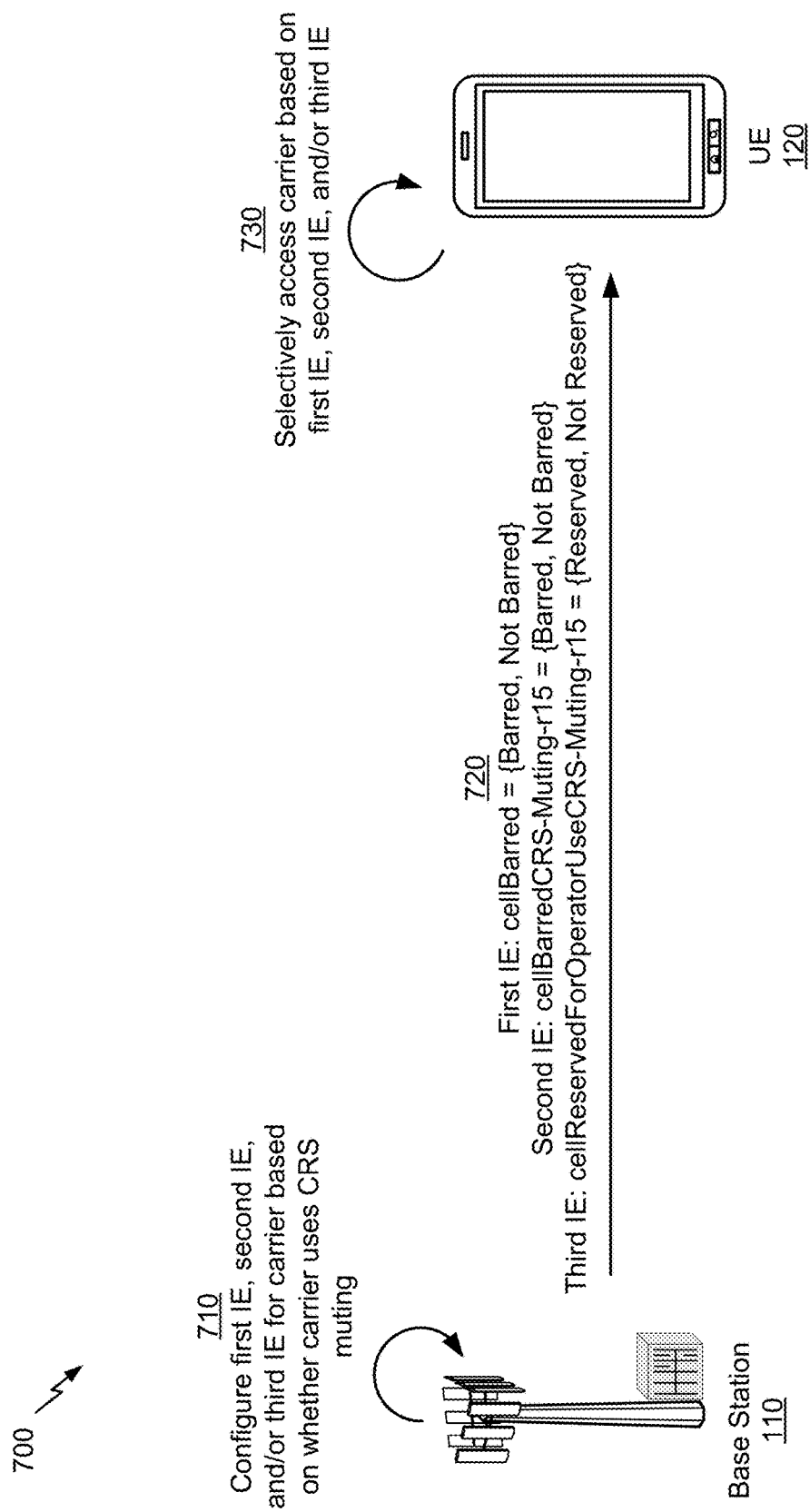

FIG. 7 is a diagram illustrating another example 700 relating to preventing UEs that do not support CRS muting from camping on CRS muted carriers, in accordance with various aspects of the present disclosure.

As shown by reference number 710, a base station 110 may configure (e.g., set a value of) a first information element (IE), a second IE, and/or a third IE based at least in part on determining whether a carrier, associated with the base station 110, uses CRS muting. In some aspects, the first IE (e.g., shown as cellBarred) may indicate whether all UEs 120 that do not support CRS muting are barred from the carrier. The second IE (e.g., shown as cellBarredCRS-Muting-r15) may indicate whether all UEs 120 that support CRS muting are barred from the carrier.

The third IE (e.g., shown as cellReservedForOperatorUseCRS-Muting-r15) may indicate whether UEs 120 that support CRS muting and that are in a particular set of access classes are barred from the carrier. For example, in some aspects, one or more carriers may be reserved for use by UEs 120 in a first set of access classes (e.g., access classes 11 and 15), while UEs 120 in a second set of access classes (e.g., access classes 0 through 9 and 12 through 14) may be barred from the one or more carriers. In some aspects, the first IE and/or the second IE may apply to all public land mobile networks (PLMNs). Additionally, or alternatively, the third IE may be PLMN-specific, and may be configured on a per-PLMN basis.

For example, if the base station 110 determines that a carrier of the base station 110 uses CRS muting, then the base station 110 may configure the first IE to indicate that all UEs that do not support CRS muting are barred from the carrier (e.g., by setting the first IE to a first value, such as "Barred"). Additionally, or alternatively, if the base station 110 determines that a carrier of the base station 110 uses CRS muting, then the base station 110 may configure the second IE to indicate that all UEs that support CRS muting are not barred from the carrier (e.g., by setting the second IE to a second value, such as "Not Barred"). In this way, legacy UEs 120 that do not support CRS muting may be barred from one or more carriers of the base station 110 (and/or all carriers of the base station 110) that use CRS muting, while UEs 120 that support CRS muting may be permitted to access these carriers.

As another example, if the base station 110 determines that a carrier of the base station 110 does not use CRS muting, then the base station 110 may configure the first IE to indicate that all UEs that do not support CRS muting are not barred from the carrier (e.g., by setting the first IE to a second value, such as "Not Barred"). Additionally, or alternatively, if the base station 110 determines that a carrier of the base station 110 does not use CRS muting, then the base station 110 may also configure the second IE to indicate that all UEs that support CRS muting are not barred from the carrier (e.g., by setting the second IE to a second value, such as "Not Barred"). In this way, both legacy UEs 120 and UEs 120 that support CRS muting may be permitted to access carriers that do not use CRS muting.

As another example, if the base station 110 determines that a carrier of the base station 110 uses CRS muting and that access to the carrier is to be reserved (e.g., for operator use, for use by a particular set of access classes, and/or the like), then the base station 110 may configure the first IE to indicate that UEs that do not support CRS muting are barred from the carrier, may configure the second IE to indicate that all UEs that support CRS muting are barred from the carrier, and may configure the third IE to indicate that access to the carrier is reserved for UEs that support CRS muting and that are in a reserved set of access classes (e.g., access classes 11 and 15). In this way, only UEs 120 that support CRS muting and that are in a reserved access class may access the carrier.

As shown by reference number 720, the base station 110 may transmit, and the UE 120 may receive, the first IE, the second IE, and/or the third IE. In some aspects, the first IE, the second IE, and/or the third IE may be transmitted in system information (e.g., a MIB, a system information block (SIB), remaining minimum system information (RMSI), other system information (OSI), and/or the like).

As shown by reference number 730, the UE 120 may selectively access (e.g., read information from, camp on, monitor, and/or the like) one or more carriers of the base station 110 based at least in part on the first IE, the second IE, and/or the third IE.

For example, if the UE 120 does not support CRS muting, then the UE 120 may not access the carrier if the first IE indicates that all UEs that do not support CRS muting are barred from the carrier. However, if the UE 120 does not support CRS muting, then the UE 120 may access the carrier if the first IE indicates that all UEs that do not support CRS muting are not barred from the carrier.

As another example, if the UE 120 supports CRS muting, then the UE 120 may not access the carrier if the second IE indicates that all UEs that support CRS muting are barred from the carrier. However, if the UE 120 supports CRS muting, then the UE 120 may access the carrier if the second IE indicates that all UEs that support CRS muting are not barred from the carrier. In this case, if the UE 120 supports CRS muting, then the UE 120 may access the carrier if the second IE indicates that all UEs that support CRS muting are not barred from the carrier regardless of an indication of the first IE.

As another example, if the UE 120 supports CRS muting and is in a reserved set of access classes (e.g., in in access class 11 or 15), then the UE 120 may access the carrier if the second IE indicates that all UEs 120 that support CRS muting are barred from the carrier, but the third IE indicates that all UEs 120 that support CRS muting and that are in the reserved set of access classes are not barred from the carrier. However, if the UE 120 supports CRS muting and is not in the reserved set of access classes (e.g., is in access class 0 through 9 or 12 through 14), then the UE 120 may not access the carrier if the second IE indicates that all UEs 120 that support CRS muting are barred from the carrier, and the third IE indicates that all UEs 120 that support CRS muting and that are in the reserved set of access classes are not barred from the carrier.

By using the above IEs, UEs 120 that do not support CRS muting may be prevented from accessing a carrier that supports CRS muting, thereby preventing negative impacts described elsewhere herein.

In some aspects, the first IE, the second IE, and/or the third IE may be configured for UEs 120 that are not capable of communicating with a 5G core network (e.g., non-enhanced LTE (non-eLTE) UEs 120). In some aspects, the first IE, the second IE, and/or the third IE may be configured for UEs 120 that are capable of communicating with a 5G core network (e.g., eLTE UEs 120). In some aspects, two different IEs corresponding to the second IE may be used, with one IE being used for UEs 120 that are not capable of communicating with a 5G core network, and another IE being used for UEs 120 that are capable of communicating with a 5G core network. Additionally, or alternatively, two different IEs corresponding to the third IE may be used, with one IE being used for UEs 120 that are not capable of communicating with a 5G core network, and another IE being used for UEs 120 that are capable of communicating with a 5G core network. Additional details are described below in connection with FIG. 8.

As indicated above, FIG. 7 is provided as an example. Other examples are possible and may differ from what was described with respect to FIG. 7.

Figure 8:
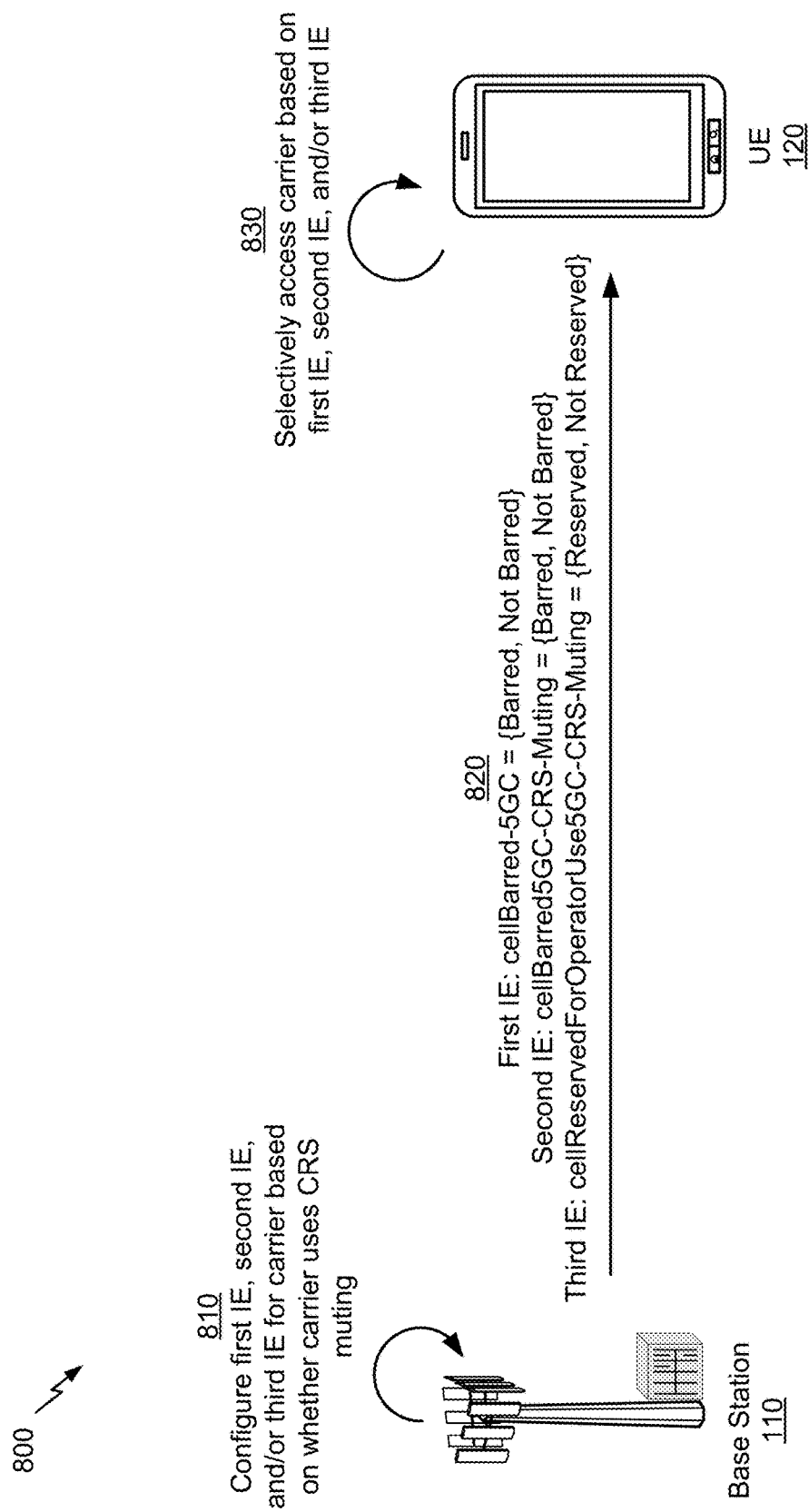

FIG. 8 is a diagram illustrating another example 800 relating to preventing UEs that do not support CRS muting from camping on CRS muted carriers, in accordance with various aspects of the present disclosure.

As shown by reference number 810, a base station 110 may configure (e.g., set a value of) a first information element (IE), a second IE, and/or a third IE based at least in part on determining whether a carrier, associated with the base station 110, uses CRS muting, in a similar manner as described above in connection with FIG. 7. In some aspects, the first IE (e.g., shown as cellBarred-5GC) may indicate whether all UEs 120 that are capable of communicating with a 5G core network and that do not support CRS muting are barred from the carrier. The second IE (e.g., shown as cellBarred5GC-CRS-Muting) may indicate whether all UEs 120 that are capable of communicating with a 5G core network and that support CRS muting are barred from the carrier.

The third IE (e.g., shown as cellReservedForOperatorUs5GCeCRS-Muting) may indicate whether UEs 120 that are capable of communicating with a 5G core network, that support CRS muting, and that are in a particular set of access classes are barred from the carrier, in a similar manner as described above in connection with FIG. 7. In some aspects, the first IE and/or the second IE may apply to all public land mobile networks (PLMNs). Additionally, or alternatively, the third IE may be PLMN-specific, and may be configured on a per-PLMN basis.

The base station 110 may configure the first IE, the second IE, and/or the third IE for UEs 120 that are capable of communicating with a 5G core network in a similar manner as described above in connection with FIG. 7.

As shown by reference number 820, the base station 110 may transmit, and the UE 120 may receive, the first IE, the second IE, and/or the third IE. In some aspects, the first IE, the second IE, and/or the third IE may be transmitted in system information (e.g., a MIB, a system information block (SIB), remaining minimum system information (RMSI), other system information (OSI), and/or the like), as described above in connection with FIG. 7.

As shown by reference number 830, the UE 120 may selectively access (e.g., read information from, camp on, monitor, and/or the like) one or more carriers of the base station 110 based at least in part on the first IE, the second IE, and/or the third IE, in a similar manner as described above in connection with FIG. 7. In some aspects, the UE 120 may read a first set of IEs if the UE 120 is not capable of communicating using a 5G core network (e.g., one or more of the IEs shown in FIG. 7 and/or described in connection with FIG. 7), or may read a second set of IEs if the UE 120 is capable of communicating using a 5G core network (e.g., one or more of the IEs shown in FIG. 8 and/or described in connection with FIG. 8). In some aspects, if the UE 120 is capable of communicating with both a 5G core network and a 4G core network, then the UE 120 may read both sets of IEs (e.g., the first set and the second set).

In some aspects, an IE may indicate whether UEs 120 that support CRS muting, that are not capable of accessing a 5G core network, and that belong to an unreserved or normal access class are barred or not barred from camping on a carrier. Another IE may indicate whether UEs 120 that support CRS muting, that are not capable of accessing a 5G core network, and that belong to a reserved or special access class are barred or not barred from camping on a carrier. Another IE may indicate whether UEs 120 that support CRS muting, that are capable of accessing a 5G core network, and that belong to an unreserved or normal access class are barred or not barred from camping on a carrier. Another IE may indicate whether UEs 120 that support CRS muting, that are capable of accessing a 5G core network, and that belong to a reserved or special access class are barred or not barred from camping on a carrier.

By using the above IEs, UEs 120 that do not support CRS muting may be prevented from accessing a carrier that supports CRS muting, thereby preventing negative impacts described elsewhere herein.

As indicated above, FIG. 8 is provided as an example. Other examples are possible and may differ from what was described with respect to FIG. 8.

Figure 9:
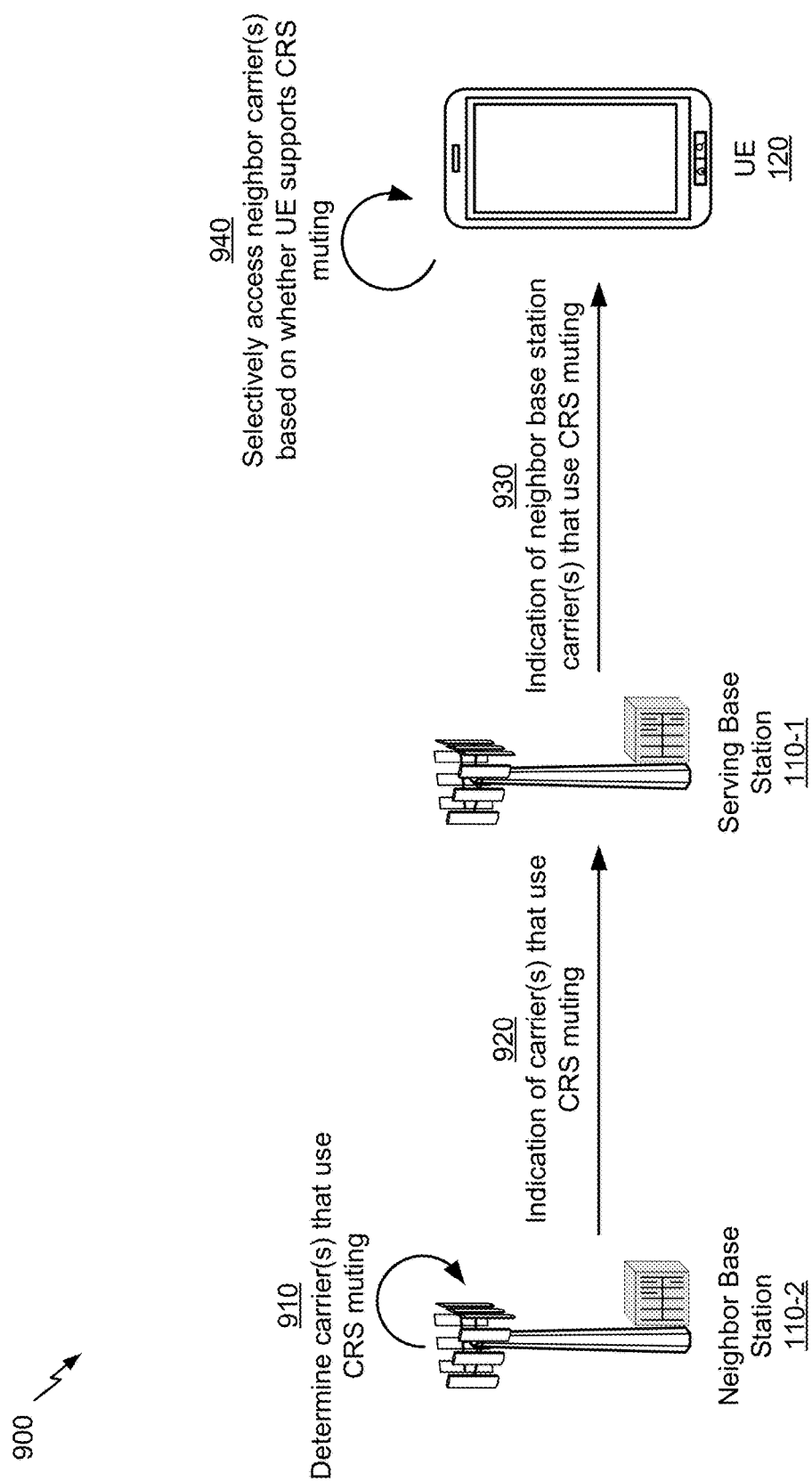

FIG. 9 is a diagram illustrating another example 900 relating to preventing UEs that do not support CRS muting from camping on CRS muted carriers, in accordance with various aspects of the present disclosure.

As shown by reference number 910, a neighbor base station 110-2 may determine one or more carriers of the neighbor base station 110-2 that use CRS muting.

As shown by reference number 920, the neighbor base station 110-2 may transmit, and a serving base station 110-1 may receive, an indication of one or more carriers of the neighbor base station 110-2 that use CRS muting. The carriers may be indicated using, for example, a first set of carrier identifiers that identify a set of carriers that support CRS muting, a second set of carrier identifiers that identify a set of carriers that do not support CRS muting, a binary indication of whether the neighbor base station 110-2 has any carriers that support CRS muting, and/or the like. In some cases, the indication may comprise separate indications for different operating frequencies (e.g. bands, E-UTRA Absolute Radio Frequency Numbers (EARFCN), and/or the like).

As shown by reference number 930, the serving base station 110-1 may transmit, and a UE 120 may receive, an indication of one or more carriers of the neighbor base station 110-2 that use CRS muting. Additionally, or alternatively, the base station 110 may transmit, and the UE 120 may receive, an indication of whether any carriers of the neighbor base station 110-2 use CRS muting. In some aspects, the indication(s) may be included in a neighbor cell list. Additionally, or alternatively, the indication(s) may be included in system information, an RRC message, and/or the like.

As shown by reference number 940, the UE 120 may selectively access at least one of the one or more carriers of the neighbor base station 110-2 that support CRS muting based at least in part on whether the UE 120 supports CRS muting. For example, the UE 120 may access at least one of the one or more carriers, that support CRS muting, if the UE 120 supports CRS muting. Alternatively, the UE 120 may not access any of the one or more carriers, that support CRS muting, if the UE 120 does not support CRS muting. In this way, resources of UEs 120 that do not support CRS muting may be conserved by preventing such UEs 120 from accessing carriers that use CRS muting.

As indicated above, FIG. 9 is provided as an example. Other examples are possible and may differ from what was described with respect to FIG. 9.

Figure 10:
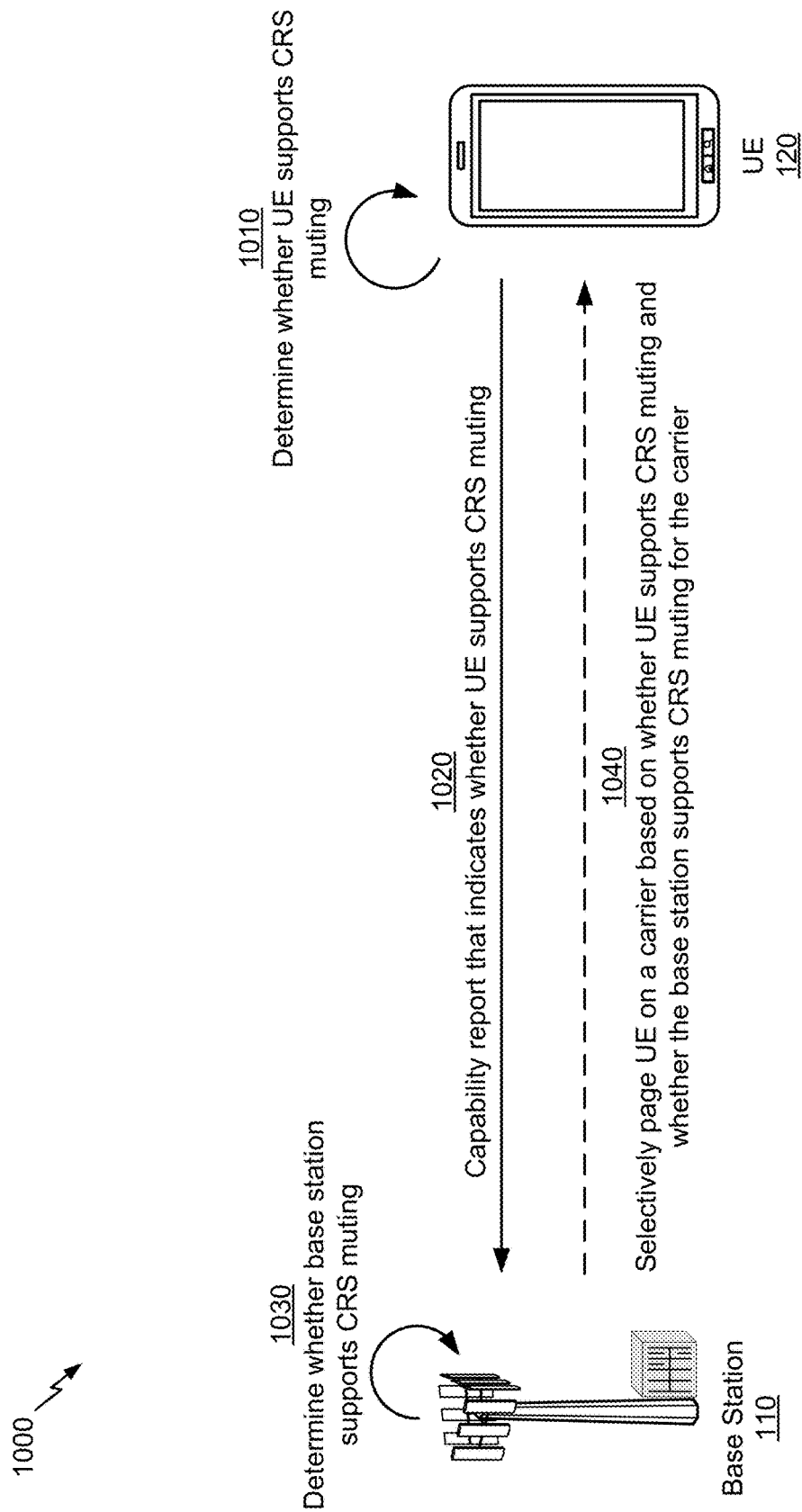

FIG. 10 is a diagram illustrating another example 1000 relating to preventing UEs that do not support CRS muting from camping on CRS muted carriers, in accordance with various aspects of the present disclosure.

As shown by reference number 1010, a UE 120 may determine whether the UE 120 supports CRS muting. For example, this determination may be based at least in part on a configuration of the UE 120.

As shown by reference number 1020, the UE 120 may transmit, and a base station 110 may receive, a capability report (e.g., a UE capability report and/or the like) that indicates whether the UE 120 supports CRS muting. In some aspects, one bit in the capability report may be used to indicate whether the UE 120 supports CRS muting (e.g., using a binary indication). In some aspects, the capability report may be transmitted from the base station 110 to a mobility management entity (MME) or other network entity.

As shown by reference number 1030, the base station 110 may determine whether the base station 110 supports CRS muting. For example, this determination may be based at least in part on a configuration of the base station 110, a determination of whether one or more carriers and/or any carriers of the base station 110 use CRS muting, and/or the like.

As shown by reference number 1040, the base station 110 and/or an MME (or similar network entity) may selectively page the UE 120 on a carrier based at least in part on whether the UE 120 supports CRS muting and whether the base station 110 supports CRS muting for the carrier. In some aspects, if the base station 110 supports CRS muting and the UE 120 does not support CRS muting, then the base station 110 may not page the UE 120 on any carriers. Alternatively, if the base station 110 supports CRS muting and the UE 120 does not support CRS muting, then the base station 110 may not page the UE 120 on a carrier that uses CRS muting, but may page the UE 120 on a carrier that does not use CRS muting. In some cases, the base station 110 and/or the MME may page a UE 120 that does not support CRS muting only on carriers and/or base stations 110 that do not support CRS muting.

In some aspects, the base station 110 may page the UE 120 if the base station 110 supports CRS muting and the UE 120 supports CRS muting. Additionally, or alternatively, the base station 110 may page the UE 120 if the base station 110 does not support CRS muting and the UE 120 does not support CRS muting. Additionally, or alternatively, the base station 110 may page the UE 120 if the base station 110 does not support CRS muting and the UE 120 supports CRS muting.

In some aspects, a core network may initiate pages, but the core network may not be informed of the UE capability. In this case, the core network may instruct the base station 110 to page the UE 120, but the base station 110 may discard the page (e.g., on a carrier that uses CRS muting) when the base station 110 supports CRS muting and the UE 120 does not support CRS muting. In some aspects, the base station 110 may initiate pages (e.g., if an RRC inactive feature is activated). In this case, the base station 110 may prevent initiation and/or transmission of a page, intended for the UE 120, when the base station 110 supports CRS muting and the UE 120 does not support CRS muting.

By signaling a UE capability regarding CRS muting as described above, resources of the base station 110 may be conserved by preventing transmission of unnecessary pages. Furthermore, network resources that would otherwise be used for those pages may also be conserved.

As indicated above, FIG. 10 is provided as an example. Other examples are possible and may differ from what was described with respect to FIG. 10.

FIG. 11 is a diagram illustrating an example process 1100 performed, for example, by a base station, in accordance with various aspects of the present disclosure. Example process 1100 is an example where a base station (e.g., base station 110 and/or the like) performs operations associated with preventing UEs that do not support CRS muting from camping on CRS muted carriers.

As shown in FIG. 11, in some aspects, process 1100 may include determining whether a carrier, associated with the base station, uses cell-specific reference signal (CRS) muting (block 1110). For example, the base station (e.g., using controller/processor 240 and/or the like) may determine whether a carrier, associated with the base station, uses CRS muting, as described above in connection with FIG. 5.

As further shown in FIG. 11, in some aspects, process 1100 may include determining a master information block (MIB) scrambling sequence or a physical broadcast channel (PBCH) scrambling sequence to be used to scramble a MIB or a PBCH of the carrier based at least in part on whether the carrier uses CRS muting (block 1120). For example, the base station (e.g., using controller/processor 240 and/or the like) may determine a MIB scrambling sequence and/or a PBCH scrambling sequence to be used to scramble a MIB and/or a PBCH of the carrier based at least in part on whether the carrier uses CRS muting, as described above in connection with FIG. 5.

As further shown in FIG. 11, in some aspects, process 1100 may include transmitting the MIB or the PBCH, wherein the MIB or the PBCH is scrambled using the determined MIB scrambling sequence or the determined PBCH scrambling sequence (block 1130). For example, the base station (e.g., using controller/processor 240, transmit processor 220, TX MIMO processor 230, MOD 232, antenna 234, and/or the like) may transmit the MIB and/or the PBCH, as described above in connection with FIG. 5. In some aspects, the MIB is scrambled using the determined MIB scrambling sequence, and/or the PBCH is scrambled using the determined PBCH scrambling sequence.

Process 1100 may include additional aspects, such as any single aspect or any combination of aspects described below and/or in connection with one or more other processes described elsewhere herein.

In a first aspect, the MIB scrambling sequence or the PBCH scrambling sequence is generated using a first scrambling sequence initialization when the carrier does not use CRS muting.

In a second aspect, alone or in combination with the first aspect, the MIB scrambling sequence or the PBCH scrambling is generated using a second scrambling sequence initialization when the carrier uses CRS muting.

In a third aspect, alone or in combination with one or more of the first and second aspects, the first scrambling sequence initialization uses a physical cell identifier.

In a fourth aspect, alone or in combination with one or more of the first through third aspects, the second scrambling sequence initialization uses a physical cell identifier plus a predefined value.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a UE, in accordance with various aspects of the present disclosure. Example process 1200 is an example where a UE (e.g., UE 120 and/or the like) performs operations associated with preventing UEs that do not support CRS muting from camping on CRS muted carriers.

As shown in FIG. 12, in some aspects, process 1200 may include receiving a master information block (MIB) or a physical broadcast channel (PBCH) (block 1210). For example, the UE (e.g., using antenna 252, DEMOD 254, MIMO detector 256, receive processor 258, controller/processor 280, and/or the like) may receive a MIB and/or a PBCH, as described above in connection with FIG. 5.

As further shown in FIG. 12, in some aspects, process 1200 may include determining that descrambling the MIB or the PBCH based at least in part on a first scrambling sequence results in an error (block 1220). For example, the UE (e.g., using controller/processor 280 and/or the like) may determine that descrambling the MIB and/or the PBCH based at least in part on a first scrambling sequence results in an error, as described above in connection with FIG. 5.

As further shown in FIG. 12, in some aspects, process 1200 may include descrambling the MIB or the PBCH based at least in part on a second scrambling sequence based at least in part on determining that descrambling the MIB or the PBCH based at least in part on the first scrambling sequence results in the error (block 1230). For example, the UE (e.g., using antenna 252, DEMOD 254, MIMO detector 256, receive processor 258, controller/processor 280, and/or the like) may descramble the MIB and/or the PBCH based at least in part on a second scrambling sequence based at least in part on determining that descrambling the MIB and/or the PBCH based at least in part on the first scrambling sequence results in the error, as described above in connection with FIG. 5.

Process 1200 may include additional aspects, such as any single aspect or any combination of aspects described below and/or in connection with one or more other processes described elsewhere herein.

In a first aspect, the first scrambling sequence is based at least in part on a physical cell identifier.

In a second aspect, alone or in combination with the first aspect, the second scrambling sequence is based at least in part on a physical cell identifier plus a predefined value.

In a third aspect, alone or in combination with one or more of the first and second aspects, the MIB or the PBCH is descrambled based at least in part on the second scrambling sequence based at least in part on a determination that the UE supports cell-specific reference signal (CRS) muting.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a base station, in accordance with various aspects of the present disclosure. Example process 1300 is an example where a base station (e.g., base station 110 and/or the like) performs operations associated with preventing UEs that do not support CRS muting from camping on CRS muted carriers.

As shown in FIG. 13, in some aspects, process 1300 may determining whether a carrier, associated with the base station, uses cell-specific reference signal (CRS) muting (block 1310). For example, the base station (e.g., using controller/processor 240 and/or the like) may determine whether a carrier, associated with the base station, uses CRS muting, as described above in connection with FIG. 6.

As further shown in FIG. 13, in some aspects, process 1300 may include determining a first symbol to be used to transmit a primary synchronization signal (PSS) and a second symbol to be used to transmit a secondary synchronization signal (SSS) based at least in part on whether the carrier uses CRS muting (block 1320). For example, the base station (e.g., using controller/processor 240 and/or the like) may determine a first symbol to be used to transmit a PSS and a second symbol to be used to transmit an SSS based at least in part on whether the carrier uses CRS muting, as described above in connection with FIG. 6.

As further shown in FIG. 13, in some aspects, process 1300 may include transmitting the PSS in the first symbol and the SSS in the second symbol (block 1330). For example, the base station (e.g., using controller/processor 240, transmit processor 220, TX MIMO processor 230, MOD 232, antenna 234, and/or the like) may transmit the PSS in the first symbol and the SSS in the second symbol, as described above in connection with FIG. 6.

Process 1300 may include additional aspects, such as any single aspect or any combination of aspects described below and/or in connection with one or more other processes described elsewhere herein.

In a first aspect, the first symbol and the second symbol follow a first symbol configuration when the carrier does not use CRS muting.

In a second aspect, alone or in combination with the first aspect, the first symbol and the second symbol follow a second symbol configuration when the carrier uses CRS muting.

In a third aspect, alone or in combination with one or more of the first and second aspects, the second symbol precedes the first symbol in the first symbol configuration.

In a fourth aspect, alone or in combination with one or more of the first through third aspects, the first symbol precedes the second symbol in the second symbol configuration.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

FIG. 14 is a diagram illustrating an example process 1400 performed, for example, by a UE, in accordance with various aspects of the present disclosure. Example process 1400 is an example where a UE (e.g., UE 120 and/or the like) performs operations associated with preventing UEs that do not support CRS muting from camping on CRS muted carriers.

As shown in FIG. 14, in some aspects, process 1400 may include determining that a primary synchronization signal (PSS) or a secondary synchronization signal (SSS) is not present in a corresponding first symbol or second symbol (block 1410). For example, the UE (e.g., using controller/processor 280 and/or the like) may determine that a PSS or an SSS is not present in a corresponding first symbol or second symbol, as described above in connection with FIG. 6.

As further shown in FIG. 14, in some aspects, process 1400 may include monitoring a third symbol for the PSS and a fourth symbol for the SSS based at least in part on determining that the PSS or the SSS is not present in the corresponding first symbol or second symbol, wherein the third symbol has a different symbol position than the first symbol within a resource block, and wherein the fourth symbol has a different symbol position than the second symbol within the resource block (block 1420). For example, the UE (e.g., using antenna 252, DEMOD 254, MIMO detector 256, receive processor 258, controller/processor 280, and/or the like) may monitor a third symbol for the PSS and a fourth symbol for the SSS based at least in part on determining that the PSS or the SSS is not present in the corresponding first symbol or second symbol, as described above in connection with FIG. 6. In some aspects, the third symbol has a different symbol position than the first symbol within a resource block. In some aspects, the fourth symbol has a different symbol position than the second symbol within the resource block.

Process 1400 may include additional aspects, such as any single aspect or any combination of aspects described below and/or in connection with one or more other processes described elsewhere herein.

In a first aspect, the third symbol has a same symbol position as the second symbol within the resource block.

In a second aspect, alone or in combination with the first aspect, the fourth symbol has a same symbol position as the first symbol within the resource block.

In a third aspect, alone or in combination with one or more of the first and second aspects, the third symbol and the fourth symbol are monitored based at least in part on a determination that the UE supports CRS muting.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a diagram illustrating an example process 1500 performed, for example, by a base station, in accordance with various aspects of the present disclosure. Example process 1500 is an example where a base station (e.g., base station 110 and/or the like) performs operations associated with preventing UEs that do not support CRS muting from camping on CRS muted carriers.

As shown in FIG. 15, in some aspects, process 1500 may include determining whether a carrier, associated with the base station, uses cell-specific reference signal (CRS) muting (block 1510). For example, the base station (e.g., using controller/processor 240 and/or the like) may determine whether a carrier, associated with the base station, uses CRS muting, as described above in connection with FIGS. 7-8.

As further shown in FIG. 15, in some aspects, process 1500 may include configuring a first information element (IE) and a second IE based at least in part on determining whether the carrier uses CRS muting, wherein the first IE indicates whether all user equipment (UEs) that do not support CRS muting are barred from the carrier and the second IE indicates whether all UEs that support CRS muting are barred from the carrier (block 1520). For example, the base station (e.g., using controller/processor 240 and/or the like) may configure a first information element (IE) and a second IE based at least in part on determining whether the carrier uses CRS muting, as described above in connection with FIGS. 7-8. In some aspects, the first IE indicates whether all UEs that do not support CRS muting are barred from the carrier. In some aspects, the second IE indicates whether all UEs that support CRS muting are barred from the carrier.

As further shown in FIG. 15, in some aspects, process 1500 may include transmitting the first IE and the second IE to a UE (block 1530). For example, the base station (e.g., using controller/processor 240, transmit processor 220, TX MIMO processor 230, MOD 232, antenna 234, and/or the like) may transmit the first IE and the second IE to a UE, as described above in connection with FIGS. 7-8.

Process 1500 may include additional aspects, such as any single aspect or any combination of aspects described below and/or in connection with one or more other processes described elsewhere herein.

In a first aspect, the first IE is configured to indicate that all UEs that do not support CRS muting are barred from the carrier and the second IE is configured to indicate that all UEs that support CRS muting are not barred from the carrier based at least in part on a determination that the carrier uses CRS muting.

In a second aspect, alone or in combination with the first aspect, at least one of the first IE or the second IE is for UEs that are not capable of communicating with a 5G core network.

In a third aspect, alone or in combination with one or more of the first and second aspects, at least one of the first IE or the second IE is for UEs that are capable of communicating with a 5G core network.

In a fourth aspect, alone or in combination with one or more of the first through third aspects, the base station may configure a third IE based at least in part on determining whether the carrier uses CRS muting, wherein the third IE indicates whether UEs that support CRS muting and that are in a particular set of access classes are barred from the carrier; and may transmit the third IE to the UE.

In a fifth aspect, alone or in combination with one or more of the first through fourth aspects, the first IE is configured to indicate that all UEs that do not support CRS muting are barred from the carrier, the second IE is configured to indicate that all UEs that support CRS muting are barred from the carrier, and the third IE is configured to indicate that access to the carrier is reserved for UEs that are not in the particular set of access classes based at least in part on a determination that the carrier uses CRS muting and that access to the carrier is to be reserved for operator use.

In a sixth aspect, alone or in combination with one or more of the first through fifth aspects, the indication of the third IE is public land mobile network (PLMN)-specific.

In a seventh aspect, alone or in combination with one or more of the first through sixth aspects, the third IE is for UEs that are not capable of communicating with a 5G core network.

In an eighth aspect, alone or in combination with one or more of the first through seventh aspects, the third IE is for UEs that are capable of communicating with a 5G core network.

In a ninth aspect, alone or in combination with one or more of the first through eighth aspects, process 1500 includes receiving, from a neighbor base station, an indication of one or more carriers of the neighbor base station that use CRS muting; and transmitting, to the UE, information that identifies the one or more carriers of the neighbor base station that use CRS muting.

In a tenth aspect, alone or in combination with one or more of the first through ninth aspects, the information is transmitted in at least one of a neighbor cell list, system information, a radio resource control message, or a combination thereof.

In an eleventh aspect, alone or in combination with one or more of the first through tenth aspects, process 1500 includes receiving a capability report that indicates whether the UE supports CRS muting.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

FIG. 16 is a diagram illustrating an example process 1600 performed, for example, by a UE, in accordance with various aspects of the present disclosure. Example process 1600 is an example where a UE (e.g., UE 120 and/or the like) performs operations associated with preventing UEs that do not support CRS muting from camping on CRS muted carriers.

As shown in FIG. 16, in some aspects, process 1600 may include receiving a first information element (IE) and a second IE, wherein the first IE indicates whether all UEs that do not support cell-specific reference signal (CRS) muting are barred from a carrier and the second IE indicates whether all UEs that support CRS muting are barred from the carrier (block 1610). For example, the UE (e.g., using antenna 252, DEMOD 254, MIMO detector 256, receive processor 258, controller/processor 280, and/or the like) may receive a first IE and a second IE, as described above in connection with FIGS. 7-8. In some aspects, the first IE indicates whether all UEs that do not support CRS muting are barred from a carrier. In some aspects, the second IE indicates whether all UEs that support CRS muting are barred from the carrier.

As further shown in FIG. 16, in some aspects, process 1600 may include selectively accessing the carrier based at least in part on at least one of the first IE or the second IE (block 1620). For example, the UE (e.g., using antenna 252, DEMOD 254, MIMO detector 256, receive processor 258, controller/processor 280, and/or the like) may selectively access the carrier based at least in part on at least one of the first IE or the second IE, as described above in connection with FIGS. 7-8.

Process 1600 may include additional aspects, such as any single aspect or any combination of aspects described below and/or in connection with one or more other processes described elsewhere herein.

In a first aspect, the carrier is not accessed when the UE does not support CRS muting and the first IE indicates that all UEs that do not support CRS muting are barred from the carrier.

In a second aspect, alone or in combination with the first aspect, the carrier is accessed when the UE does not support CRS muting and the first IE indicates that all UEs that do not support CRS muting are not barred from the carrier.

In a third aspect, alone or in combination with one or more of the first and second aspects, the carrier is not accessed when the UE supports CRS muting and the second IE indicates that all UEs that support CRS muting are barred from the carrier.

In a fourth aspect, alone or in combination with one or more of the first through third aspects, the carrier is accessed when the UE supports CRS muting and the second IE indicates that all UEs that support CRS muting are not barred from the carrier.

In a fifth aspect, alone or in combination with one or more of the first through fourth aspects, the carrier is accessed, regardless of an indication of the first IE, when the UE supports CRS muting and the second IE indicates that all UEs that support CRS muting are not barred from the carrier.

In a sixth aspect, alone or in combination with one or more of the first through fifth aspects, at least one of the first IE or the second IE for UEs that are not capable of communicating with a 5G core network.

In a seventh aspect, alone or in combination with one or more of the first through sixth aspects, at least one of the first IE or the second IE is for UEs that are capable of communicating with a 5G core network.

In an eighth aspect, alone or in combination with one or more of the first through seventh aspects, the UE may receive a third IE, wherein the third IE indicates whether UEs that support CRS muting and that are in a particular set of access classes are barred from the carrier; and may selectively access the carrier based at least in part on at least one of the first IE, the second IE, or the third IE.

In a ninth aspect, alone or in combination with one or more of the first through eighth aspects, the indication of the third IE is public land mobile network (PLMN)-specific.

In a tenth aspect, alone or in combination with one or more of the first through ninth aspects, the third IE is for UEs that are not capable of communicating with a 5G core network.

In an eleventh aspect, alone or in combination with one or more of the first through tenth aspects, the third IE is for UEs that are capable of communicating with a 5G core network.

In a twelfth aspect, alone or in combination with one or more of the first through eleventh aspects, process 1600 includes receiving, from a serving base station, an indication of one or more carriers of a neighbor base station that use CRS muting; and selectively accessing at least one of the one or more carriers based at least in part on whether the UE supports CRS muting.

In a thirteenth aspect, alone or in combination with one or more of the first through twelfth aspects, the indication is received in at least one of a neighbor cell list, system information, a radio resource control message, or a combination thereof.

In a fourteenth aspect, alone or in combination with one or more of the first through thirteenth aspects, process 1600 includes transmitting a capability report that indicates whether the UE supports CRS muting.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

FIG. 17 is a diagram illustrating an example process 1700 performed, for example, by a base station, in accordance with various aspects of the present disclosure. Example process 1700 is an example where a base station (e.g., base station 110 and/or the like) performs operations associated with preventing UEs that do not support CRS muting from camping on CRS muted carriers.

As shown in FIG. 17, in some aspects, process 1700 may include receiving, from a neighbor base station, an indication of one or more carriers of the neighbor base station that use cell-specific reference signal (CRS) muting (block 1710). For example, the base station (e.g., using antenna 234, DEMOD 232, MIMO detector 236, receive processor 238, controller/processor 240, and/or the like) may receive, from a neighbor base station, an indication of one or more carriers of the neighbor base station that use CRS muting, as described above in connection with FIG. 9.

As further shown in FIG. 17, in some aspects, process 1700 may include transmitting, to a user equipment (UE), information that identifies the one or more carriers of the neighbor base station that use CRS muting (block 1720). For example, the base station (e.g., using controller/processor 240, transmit processor 220, TX MIMO processor 230, MOD 232, antenna 234, and/or the like) may transmit, to a UE, information that identifies the one or more carriers of the neighbor base station that use CRS muting, as described above in connection with FIG. 9.

Process 1700 may include additional aspects, such as any single aspect or any combination of aspects described below and/or in connection with one or more other processes described elsewhere herein.

In a first aspect, the information is transmitted in a neighbor cell list.

In a second aspect, alone or in combination with the first aspect, the information is transmitted in at least one of system information, a radio resource control (RRC) message, or some combination thereof.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

FIG. 18 is a diagram illustrating an example process 1800 performed, for example, by a UE, in accordance with various aspects of the present disclosure. Example process 1800 is an example where a UE (e.g., UE 120 and/or the like) performs operations associated with preventing UEs that do not support CRS muting from camping on CRS muted carriers.

As shown in FIG. 18, in some aspects, process 1800 may include receiving, from a serving base station, an indication of one or more carriers of a neighbor base station that use cell-specific reference signal (CRS) muting (block 1810). For example, the UE (e.g., using antenna 252, DEMOD 254, MIMO detector 256, receive processor 258, controller/processor 280, and/or the like) may receive, from a serving base station, an indication of one or more carriers of a neighbor base station that use CRS muting, as described above in connection with FIG. 9.

As further shown in FIG. 18, in some aspects, process 1800 may include selectively accessing at least one of the one or more carriers based at least in part on whether the UE supports CRS muting (block 1820). For example, the UE (e.g., using antenna 252, DEMOD 254, MIMO detector 256, receive processor 258, controller/processor 280, and/or the like) may selectively access at least one of the one or more carriers based at least in part on whether the UE supports CRS muting, as described above in connection with FIG. 9.

Process 1800 may include additional aspects, such as any single aspect or any combination of aspects described below and/or in connection with one or more other processes described elsewhere herein.

In a first aspect, the indication is received in a neighbor cell list.

In a second aspect, alone or in combination with the first aspect, the indication is received in at least one of system information, a radio resource control (RRC) message, or some combination thereof.

In a third aspect, alone or in combination with one or more of the first and second aspects, the at least one of the one or more carriers is accessed when the UE supports CRS muting.

In a fourth aspect, alone or in combination with one or more of the first through third aspects, the one or more carriers are not accessed when the UE does not support CRS muting.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

FIG. 19 is a diagram illustrating an example process 1900 performed, for example, by a base station, in accordance with various aspects of the present disclosure. Example process 1900 is an example where a base station (e.g., base station 110 and/or the like) performs operations associated with preventing UEs that do not support CRS muting from camping on CRS muted carriers.

As shown in FIG. 19, in some aspects, process 1900 may include receiving, from a user equipment (UE), a capability report that indicates whether the UE supports cell-specific reference signal (CRS) muting (block 1910). For example, the base station (e.g., using antenna 234, DEMOD 232, MIMO detector 236, receive processor 238, controller/processor 240, and/or the like) may receive, from a UE, a capability report that indicates whether the UE supports CRS muting, as described above in connection with FIG. 10.

As further shown in FIG. 19, in some aspects, process 1900 may include determining whether the base station supports CRS muting (block 1920). For example, the base station (e.g., using controller/processor 240 and/or the like) may determine whether the base station supports CRS muting, as described above in connection with FIG. 10.

As further shown in FIG. 19, in some aspects, process 1900 may include selectively paging the UE on a carrier based at least in part on whether the UE supports CRS muting and whether the base station supports CRS muting for the carrier (block 1930). For example, the base station (e.g., using controller/processor 240, transmit processor 220, TX MIMO processor 230, MOD 232, antenna 234, and/or the like) may selectively page the UE on a carrier based at least in part on whether the UE supports CRS muting and whether the base station supports CRS muting for the carrier, as described above in connection with FIG. 10.

Process 1900 may include additional aspects, such as any single aspect or any combination of aspects described below and/or in connection with one or more other processes described elsewhere herein.

In a first aspect, the UE is not paged on the carrier when the base station supports CRS muting and the UE does not support CRS muting.

In a second aspect, alone or in combination with the first aspect, the base station discards a page, received from a core network and intended for the UE, when the base station supports CRS muting and the UE does not support CRS muting.

In a third aspect, alone or in combination with one or more of the first and second aspects, the base station prevents initiation of a page, by the base station, when the base station supports CRS muting and the UE does not support CRS muting.

In a fourth aspect, alone or in combination with one or more of the first through third aspects, the base station pages the UE on a different carrier that does not use CRS muting when the base station supports CRS muting on the carrier and the UE does not support CRS muting.

In a fifth aspect, alone or in combination with one or more of the first through fourth aspects, the UE is paged when the base station supports CRS muting and the UE supports CRS muting, the base station does not support CRS muting and the UE does not support CRS muting, or the base station does not support CRS muting and the UE supports CRS muting.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

FIG. 20 is a diagram illustrating an example process 2000 performed, for example, by a UE, in accordance with various aspects of the present disclosure. Example process 2000 is an example where a UE (e.g., UE 120 and/or the like) performs operations associated with preventing UEs that do not support CRS muting from camping on CRS muted carriers.

As shown in FIG. 20, in some aspects, process 2000 may include determining whether the UE supports cell-specific reference signal (CRS) muting (block 2010). For example, the UE (e.g., using controller/processor 280 and/or the like) may determine whether the UE supports CRS muting, as described above in connection with FIG. 10.

As further shown in FIG. 20, in some aspects, process 2000 may include transmitting, to a base station, a capability report that indicates whether the UE supports CRS muting (block 2020). For example, the UE (e.g., using controller/processor 280, transmit processor 264, TX MIMO processor 266, MOD 254, antenna 252, and/or the like) may transmit, to a base station, a capability report that indicates whether the UE supports CRS muting, as described above in connection with FIG. 10.

Process 2000 may include additional aspects, such as any single aspect or any combination of aspects described in connection with one or more other processes described elsewhere herein.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a first information element (IE) and a second IE, wherein the first IE indicates whether UEs that do not support cell-specific reference signal (CRS) muting are barred from a carrier and the second IE indicates whether UEs that support CRS muting are barred from the carrier;
   selectively accessing the carrier based at least in part on at least one of the first IE or the second IE;
   receiving, from a serving base station, an indication of one or more carriers of a neighbor base station that use CRS muting,
      wherein the indication is received in at least one of a neighbor cell list, system information, a radio resource control message, or a combination thereof; and
   selectively accessing at least one of the one or more carriers based at least in part on whether the UE supports CRS muting.

2. The method of claim 1, wherein the carrier is not accessed when the UE does not support CRS muting and the first IE indicates that UEs that do not support CRS muting are barred from the carrier, or wherein the carrier is accessed when the UE does not support CRS muting and the first IE indicates that UEs that do not support CRS muting are not barred from the carrier.

3. The method of claim 1, wherein the carrier is not accessed when the UE supports CRS muting and the second IE indicates that UEs that support CRS muting are barred from the carrier, or wherein the carrier is accessed when the UE supports CRS muting and the second IE indicates that UEs that support CRS muting are not barred from the carrier.

4. The method of claim 1, wherein the carrier is accessed, regardless of an indication of the first IE, when the UE supports CRS muting and the second IE indicates that UEs that support CRS muting are not barred from the carrier.

5. The method of claim 1, wherein at least one of the first IE or the second IE is for UEs that are not capable of communicating with a 5G core network.

6. The method of claim 1, wherein at least one of the first IE or the second IE is for UEs that are capable of communicating with a 5G core network.

7. The method of claim 1, further comprising receiving a third IE, wherein the third IE indicates whether UEs that support CRS muting and that are in a particular set of access classes are barred from the carrier; and
selectively accessing the carrier based at least in part on at least one of the first IE, the second IE, or the third IE.

8. The method of claim 7, wherein the indication of the third IE is public land mobile network (PLMN)-specific.

9. The method of claim 7, wherein the third IE is for UEs that are not capable of communicating with a 5G core network.

10. The method of claim 7, wherein the third IE is for UEs that are capable of communicating with a 5G core network.

11. The method of claim 1, further comprising transmitting a capability report that indicates whether the UE supports CRS muting.

12. The method of claim 1, wherein the indication is received in the radio resource control message.

13. The method of claim 1, wherein the indication uses at least one of a first set of carrier identifiers that identify a set of carriers that support CRS muting or a second set of carrier identifiers that identify a set of carriers that do not support CRS muting.

14. A method of wireless communication performed by a base station, comprising:
determining whether a carrier, associated with the base station, uses cell-specific reference signal (CRS) muting;
configuring a first information element (IE) and a second IE based at least in part on determining whether the carrier uses CRS muting, wherein the first IE indicates whether user equipment (UEs) that do not support CRS muting are barred from the carrier and the second IE indicates whether UEs that support CRS muting are barred from the carrier;
transmitting the first IE and the second IE to a UE;
receiving, from a neighbor base station, an indication of one or more carriers of the neighbor base station that use CRS muting; and
transmitting, to the UE, information that identifies the one or more carriers of the neighbor base station that use CRS muting,
wherein the information is transmitted in at least one of a neighbor cell list, system information, a radio resource control message, or a combination thereof.

15. The method of claim 14, wherein the first IE is configured to indicate that UEs that do not support CRS muting are barred from the carrier and the second IE is configured to indicate that UEs that support CRS muting are not barred from the carrier based at least in part on a determination that the carrier uses CRS muting.

16. The method of claim 14, wherein at least one of the first IE or the second IE is for UEs that are not capable of communicating with a 5G core network.

17. The method of claim 14, wherein at least one of the first IE or the second IE is for UEs that are capable of communicating with a 5G core network.

18. The method of claim 14, further comprising configuring a third IE based at least in part on determining whether the carrier uses CRS muting, wherein the third IE indicates whether UEs that support CRS muting and that are in a particular set of access classes are barred from the carrier; and
transmitting the third IE to the UE.

19. The method of claim 18, wherein the first IE is configured to indicate that UEs that do not support CRS muting are barred from the carrier, the second IE is configured to indicate that UEs that support CRS muting are barred from the carrier, and the third IE is configured to indicate that access to the carrier is reserved for UEs that are not in the particular set of access classes based at least in part on a determination that the carrier uses CRS muting and that access to the carrier is to be reserved for operator use.

20. The method of claim 18, wherein the indication of the third IE is public land mobile network (PLMN)-specific.

21. The method of claim 18, wherein the third IE is for UEs that are not capable of communicating with a 5G core network.

22. The method of claim 18, wherein the third IE is for UEs that are capable of communicating with a 5G core network.

23. The method of claim 14, further comprising receiving a capability report that indicates whether the UE supports CRS muting.

24. The method of claim 14, wherein the information is transmitted in the radio resource control message.

25. The method of claim 14, wherein the indication uses at least one of a first set of carrier identifiers that identify a set of carriers that support CRS muting or a second set of carrier identifiers that identify a set of carriers that do not support CRS muting.

26. The method of claim 14, wherein the indication includes separate indications for different operating frequencies.

27. A method of wireless communication performed by a user equipment (UE) comprising:
receiving a master information block (MIB) or a physical broadcast channel (PBCH);
determining that descrambling the MIB or the PBCH based at least in part on a first scrambling sequence results in an error,
wherein the first scrambling sequence is based at least in part on a physical cell identifier; and
descrambling the MIB or the PBCH based at least in part on a second scrambling sequence based at least in part on determining that descrambling the MIB or the PBCH based at least in part on the first scrambling sequence results in the error,
wherein the second scrambling sequence is based at least in part on a physical cell identifier plus a predefined value.

28. The method of claim 27, wherein the MIB or the PBCH is descrambled based at least in part on the second scrambling sequence based at least in part on a determination that the UE supports cell-specific reference signal (CRS) muting.

29. A method of wireless communication performed by a user equipment (UE), comprising:
determining that a primary synchronization signal (PSS) or a secondary synchronization signal (SSS) is not present in a corresponding first symbol or second symbol; and
monitoring a third symbol for the PSS and a fourth symbol for the SSS based at least in part on determining that the PSS or the SSS is not present in the corresponding first symbol or second symbol, wherein the third symbol has a different symbol position than the first symbol within a resource block, and wherein the fourth symbol has a different symbol position than the second symbol within the resource block.

30. The method of claim 29, wherein the third symbol has a same symbol position as the second symbol within the resource block, and wherein the fourth symbol has a same symbol position as the first symbol within the resource block.

31. The method of claim 29, wherein the third symbol and the fourth symbol are monitored based at least in part on a determination that the UE supports cell-specific reference signal (CRS) muting.

32. A user equipment (UE) for wireless communication, comprising:
   memory;
   one or more processors coupled to the memory; and
   instructions stored in the memory and operable, when executed by the one or more processors, to cause the UE to:
      receive a first information element (IE) and a second IE, wherein the first IE indicates whether UEs that do not support cell-specific reference signal (CRS) muting are barred from a carrier and the second IE indicates whether UEs that support CRS muting are barred from the carrier;
      selectively access the carrier based at least in part on at least one of the first IE or the second IE;
      receive, from a serving base station, an indication of one or more carriers of a neighbor base station that use CRS muting,
         wherein the indication is received in at least one of a neighbor cell list, system information, a radio resource control message, or a combination thereof; and
      selectively access at least one of the one or more carriers based at least in part on whether the UE supports CRS muting.

33. The UE of claim 32, wherein the carrier is not accessed when the UE does not support CRS muting and the first IE indicates that UEs that do not support CRS muting are barred from the carrier, or wherein the carrier is accessed when the UE does not support CRS muting and the first IE indicates that UEs that do not support CRS muting are not barred from the carrier.

34. The UE of claim 32, wherein the carrier is not accessed when the UE supports CRS muting and the second IE indicates that UEs that support CRS muting are barred from the carrier, or wherein the carrier is accessed when the UE supports CRS muting and the second IE indicates that UEs that support CRS muting are not barred from the carrier.

35. A base station for wireless communication, comprising:
   memory;
   one or more processors coupled to the memory; and
   instructions stored in the memory and operable, when executed by the one or more processors, to cause the base station to:
      determine whether a carrier, associated with the base station, uses cell-specific reference signal (CRS) muting;
      configure a first information element (IE) and a second IE based at least in part on determining whether the carrier uses CRS muting, wherein the first IE indicates whether user equipment (UEs) that do not support CRS muting are barred from the carrier and the second IE indicates whether UEs that support CRS muting are barred from the carrier;
      transmit the first IE and the second IE to a UE;
      receive, from a neighbor base station, an indication of one or more carriers of the neighbor base station that use CRS muting; and
      transmit, to the UE, information that identifies the one or more carriers of the neighbor base station that use CRS muting,
         wherein the information is transmitted in at least one of a neighbor cell list, system information, a radio resource control message, or a combination thereof.

36. The base station of claim 35, wherein the first IE is configured to indicate that UEs that do not support CRS muting are barred from the carrier and the second IE is configured to indicate that UEs that support CRS muting are not barred from the carrier based at least in part on a determination that the carrier uses CRS muting.

37. The base station of claim 35, wherein at least one of the first IE or the second IE is for UEs that are not capable of communicating with a 5G core network.

* * * * *